United States Patent
Morimoto et al.

(10) Patent No.: US 7,043,149 B2
(45) Date of Patent: May 9, 2006

(54) ELECTRIC WATER HEATER

(75) Inventors: Yasushi Morimoto, Kobe (JP); Tadashi Tanno, Kobe (JP); Toyoaki Takeshita, Kobe (JP); Masanobu Yamada, Hiroshima (JP); Masashi Kanbara, Akashi (JP); Masaharu Ohashi, Kobe (JP); Fumitaka Ogasawara, Kobe (JP); Hisashi Wada, Kobe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 29 days.

(21) Appl. No.: 10/491,700

(22) PCT Filed: Apr. 28, 2003

(86) PCT No.: PCT/JP03/05478

§ 371 (c)(1),
(2), (4) Date: Apr. 2, 2004

(87) PCT Pub. No.: WO03/090591

PCT Pub. Date: Nov. 6, 2003

(65) Prior Publication Data

US 2005/0053370 A1    Mar. 10, 2005

(30) Foreign Application Priority Data

| Apr. 26, 2002 | (JP) | ............................ 2002-126825 |
| May 9, 2002 | (JP) | ............................ 2002-134199 |
| May 9, 2002 | (JP) | ............................ 2002-134200 |
| Jun. 27, 2002 | (JP) | ............................ 2002-187218 |
| Jul. 5, 2002 | (JP) | ............................ 2002-197046 |

(51) Int. Cl.
*F24H 1/18* (2006.01)

(52) U.S. Cl. ...................... 392/441; 392/442; 392/445

(58) Field of Classification Search ................ 392/441, 392/442, 449, 450, 451
See application file for complete search history.

(56) References Cited

FOREIGN PATENT DOCUMENTS

| JP | 63-292921 | 11/1988 |
| JP | 5-293046 | 11/1993 |
| JP | 11-342075 | 12/1999 |
| JP | 2000-135168 | 5/2000 |
| JP | 2000-186859 | 7/2000 |
| JP | 2000-253998 | 9/2000 |
| JP | 2000-342457 | 12/2000 |
| JP | 2001-070162 | 3/2001 |
| JP | 2001-263817 | 9/2001 |
| JP | 2001-263818 | 9/2001 |
| JP | 2001-292903 | 10/2001 |

*Primary Examiner*—Thor S. Campbell
(74) *Attorney, Agent, or Firm*—Pearne & Gordon LLP

(57) ABSTRACT

In order to heat and warm only the amount of water required in immediate future and to reduce a power consumption by avoiding warming of unnecessary water, a main body provided with a water storage container and a water heating container can be attached and detached and a water heating amount or a water warming amount to be heated at one time is reduced and divided, thus, power consumption during warming is reduced. Furthermore, since the water storage container is provided independently, water supply can be carried out conveniently regardless of the state of the water-heating container. Water supply to the water-heating container is carried out automatically using a water amount sensor, hence no operation by a user is required.

17 Claims, 18 Drawing Sheets

ELECTRIC WATER HEATER

TECHNICAL FIELD

The present invention relates to an electric water heater wherein liquid, such as water, is supplied from a water storage tank to a water-heating tank, and heated and warmed liquid in the water-heating tank is supplied to a user.

BACKGROUND TECHNOLOGY

A cross-sectional structure of a conventional electric water heater is shown in FIG. 18. In the figure, the main body 531 of the electric water heater is provided with a nearly cylindrical container 532 having a heater 533 serving as a heating device at the bottom. Below the container 532, a centrifugal pump 534 serving as a water conveyance device is provided, one end of which is connected to an outlet 535 provided at the bottom of the container 532 and the other end of which is connected to a transfer pipe 536. At the bottom face of the container 532, a temperature detection device 537 for detecting the temperature of the hot water in the container 532 is provided. On the upper face of the main body 531, an operation section 538 having an operation button and a display section is provided. A control circuit 539 controls the heater 533 and the centrifugal pump 534 corresponding to signals from the operation section 538.

The operation of the conventional electric water heater configured as described above will be described below. First, a predetermined amount of water is supplied into the container 532. When connected to power source, the control circuit 539 starts to supply electric power to the heater 533. When the temperature detection device 537 detects the boiling of water, the control circuit 539 stops supplying electric power to the heater 533 once and enters a warming operation state wherein hot water in the container 532 is warmed at a predetermined temperature while electric power supply to the heater 533 is controlled according to a signal from the temperature detection device 537.

When a user who wishes to use hot water operates the operation button of the operation section 538, the centrifugal pump 534 is driven by the control of the control circuit 539, and the hot water in the container 532 is supplied via the transfer pipe 536. When the operation of the operation button is stopped after a desired amount of hot water is supplied, hot water supply stops.

In order to recognize the water level in the container 532, the transfer pipe 536 is generally formed of a transparent glass pipe and the transfer pipe 536 is made visible from outside, whereby the amount of the hot water is confirmed. When the amount of the hot water has reduced, the user supplies water into the container 532.

In the above-mentioned conventional configuration, the water-heating container also functions as a water storage container. Hence, it is usually necessary to store a large amount of hot water, for example, several times the amount of hot water to be used one time (about 100 to 500 cc). Even when a small amount of hot water is required, a large amount of hot water being stored is heated and warmed at all times, thereby causing a problem of consuming electric power wastefully. When an upper lid 545 is opened for water replenishment, a problem of requiring caution for the scattering of hot water having a high temperature, steam and the like is also caused.

As an electric water heater configured to solve the above-mentioned problems, an electric water heater having two tanks, that is, a water storage tank and a water-heating tank, is available. When the hot water in the water-heating tank has reduced, water is automatically supplied from the water storage tank. In this electric water heater, only the amount of water required for one-time use is heated and warmed in the water-heating tank. Hence, the water heater is characterized in that power consumption is reduced. Detection as to whether water is present or not in the water storage tank is carried out by using a method in which a pump for supplying water from the water storage tank to the water-heating tank is operated and a judgment as to whether water is present or not is made depending on the load of the pump. Therefore, periodical pump operation is necessary in order to detect whether water is present or not in the water storage tank.

Since the pump is operated periodically, problems are caused, that is, noise is generated when the pump is operated, and the life of the pump is shortened.

In the above-mentioned electric water heater provided with a plurality of containers of water-heating tank and water storage tank, water is supplied from the water supply container when the hot water in the water-heating container is reduced. In order that hot water shortage is not caused, a method is proposed in which a small amount of water is supplied each time a small amount of hot water is used. Another water heater is also available in which the amount of hot water in the water-heating container is detected by a water amount detection section and water supply is started when the amount of hot water remaining in the water-heating container becomes less than a predetermined amount of hot water.

In this configuration, when the remaining amount of hot water becomes less than the predetermined amount, water supply is started immediately. Hence, if the remaining amount of hot water becomes less than the predetermined amount while the user continuously discharges hot water, water supply begins immediately. This causes an inconvenience of discharging hot water having a lower temperature.

A method of preventing the temperature drop of hot water by interrupting water supply during hot water discharge is also available. However, when hot water is discharged intermittently at short time intervals, for example, when hot water is poured into a plurality of cups of noodles, water supply is carried out between the last hot water discharge and the next hot water discharge. This causes an inconvenience of discharging hot water having a lower temperature.

In the above-mentioned electric water heater provided with the water-heating container and the water supply container holding water to be supplied automatically to this water-heating container so that hot water is not exhausted even in the case when the consumption amount of hot water is large, water is supplied from the water supply container until the water-heating container is filled, each time hot water is used, so that the hot water in the water-heating container is not exhausted by the reduction of hot water.

In this case, since water is supplied to the full level immediately after hot water is used, the user must wait until the whole water supplied to the full level is boiled when an actually required amount of water is more than the full-level amount of water as a matter of course and even when an actually required amount of water is considerably less than the full-level amount of water. Consequently this has a problem of extending the waiting time and lowering usability. For example, in the case when hot water is desired to be poured into six cups of noodles from an electric water heater having a full-level capacity capable of pouring hot water into five cups of noodles, hot water is poured into the five cups of noodles, first. Then, after water is supplied to the full level by automatic water supply, a wait is required until water is boiled, and hot water must be poured into the remaining one cup of noodles. In this case, extra hot water for four cups of noodles is heated, whereby a considerable time difference exists between the time when hot water is poured into the first five cups of noodles and the time when hot water is poured into the last one cup of noodles, including the time for water supply. As a result, the eating start time of only one person is delayed considerably.

In the case when hot water is drained and the electric power source is turned off in the evening for energy conservation, and water is supplied and heated for one cup of coffee in the next morning, in the above-mentioned conventional electric water heater, a considerable time is required until boiling is completed from heating is carried out after water is supplied automatically to the full level. This is caused by that a large amount of hot water is required to be heated even in the case when only one cup of coffee is desired, thereby causing a problem of extending a waiting time.

DISCLOSURE OF THE INVENTION

The present invention is intended to provide an electric water heater in which a water storage container and a water-heating container are separated from each other, and the amount of hot water to be heated and the amount of hot water to be warmed at one time are reduced while the total amount of water to be heated is maintained so as to be equivalent to that of a conventional water heater, thereby a power consumption is reduced during a warming state, and an independent water storage container is provided so that water supply can be carried out conveniently and safely regardless of the state of the hot water in the water-heating container.

The electric water heater in accordance with the present invention comprises a main body provided with a water-heating container, a water storage container for storing liquid, a heating device for heating the liquid in the above-mentioned water-heating container, a hot water discharge passage for discharging the liquid in the above-mentioned water-heating container, a hot water discharge section provided in the above-mentioned hot water discharge passage, a supply passage for supplying the liquid in the above-mentioned water storage container to the above-mentioned water-heating container, and a water conveyance device provided in the above-mentioned supply passage. A connection section is provided in the middle of the above-mentioned supply passage, and disconnection and connection are carried out at the above-mentioned connection section, whereby the above-mentioned water storage container can be attached to and detached from the above-mentioned main body.

Hence, while the total amount of water to be heated is maintained so as to be equivalent to that of a conventional product, the amount of water to be heated (hereafter referred to as a water heating amount) or the amount of hot water to be warmed (hereafter referred to as a water warming amount) at one time is reduced. In addition, the water heating amount is subdivided by carrying out water supply and water heating as required, whereby power consumption during a warming state can be reduced. Furthermore, since the water storage container being able to be attached/detached is provided independently, water supply can be carried out conveniently regardless of the state of the hot water in the water-heating container.

An electric water heater in accordance with claim 1 of the invention comprises a main body provided with a water-heating container, a water storage container for storing liquid, a heating device for heating the liquid in the above-mentioned water-heating container, a hot water discharge passage for discharging the liquid in the above-mentioned water-heating container, a hot water discharge section provided in the above-mentioned hot water discharge passage, a supply passage for supplying the liquid in the above-mentioned water storage container to the above-mentioned water-heating container, and a water conveyance device provided in the above-mentioned supply passage. A connection section is provided in the middle of the above-mentioned supply passage, and disconnection and connection are carried out at the above-mentioned connection section, whereby the above-mentioned water storage container can be attached to and detached from the above-mentioned main body.

Since the water-heating container and the water storage container are provided, the water heating amount or the water warming amount used at one time is reduced and subdivided while the total water heating amount or the total water warming amount is maintained at a predetermined amount, whereby power consumption during a warming state can be reduced. Since the water storage container being independent is provided, water supply can be carried out conveniently regardless of the state of the hot water in the water-heating container. A connection section is provided in the middle of the supply passage, and disconnection and connection are carried out at the connection section, whereby the water storage container can be attached to and detached from the above-mentioned water-heating container, and water supply to the water storage container or cleaning of the container can be done easily.

In an electric water heater in accordance with claim 2 of the invention, a check valve for allowing liquid to pass through in only one direction from the water storage container to the water-heating container is provided in the middle of the supply passage. Hence, there is no fear of allowing liquid to reversely flow from the water-heating container to the water storage container.

An electric water heater in accordance with claim 3 of the invention is provided with a water amount sensor for detecting the amount of liquid in the water-heating container and a control circuit for controlling the water conveyance amount of the water conveyance device on the basis of the detection result of the water amount sensor. Water supply can be carried out automatically from the water storage container to the water-heating container depending on the amount of water in the water-heating container, and the timing of water supply and the amount of water supply to the water-heating container can be controlled. Hence, water supply can be carried out without greatly lowering the temperature of hot water and a stable amount of hot water can be kept.

In an electric water heater in accordance with claim 4 of the invention, the liquid inlet of the supply passage connected to the water-heating container is provided above the full levels of the water-heating container and the water storage container. Hence, overflow of the water in the water-heating container beyond the full level line owing to the siphon phenomenon wherein water is supplied continuously owing to the head difference between the water level of the water-heating container and that of the water storage container can be prevented from occurring. When water is directly poured into the water-heating container or during boiling, even if the water level in the water-heating container rises close to the liquid inlet, reverse flow of hot water from the water-heating container to the water storage container can be prevented.

In an electric water heater in accordance with claim 5 of the invention, a supply passage is provided so that water is supplied from the liquid inlet to the water-heating container by using free fall or a downward slope. Since water is supplied ultimately by the free fall, it can be guided smoothly into the water-heating container.

In an electric water heater in accordance with claim 6 of the invention, a liquid guide section is provided in the vicinity of the liquid inlet. The above-mentioned liquid guide section guides and pours water along the inner wall face of the water-heating container. Hence, the water having passed through the supply passage is guided to the inner wall face of the water-heating container and directly poured over the surface of the water along the inner wall face. Noise during the scattering and pouring of water is reduced in comparison with the case when water is directly poured from the liquid inlet along a parabola.

In an electric water heater in accordance with claim 7 of the invention, a liquid guide section for pouring water along the inner wall face of the water-heating container is provided in the vicinity of the liquid inlet, and a liquid reforming section for improving the quality of liquid is provided in one or both of the above-mentioned liquid guide section and hot water discharge passage to eliminate or add various substances.

Furthermore, the present invention is intended to provide an electric water heater wherein noise from the water supply section at the time when a judgment is made as to whether water supply to the water storage tank is necessary or not is eliminated and its durability is improved.

In the electric water heater in accordance with the present invention, in order that the above-mentioned object is attained, the driving control of the water supply section for supplying the water in the water storage tank to the water-heating tank is restricted to a minimum necessary amount. Hence, noise from the water supply section at the time when a judgment is made as to whether water supply to the water storage tank is necessary or not is eliminated and the durability of the water supply section is improved.

An electric water heater in accordance with claim 8 of the invention comprises a water-heating tank, a water storage tank for storing liquid, a water supply section for supplying the water in the above-mentioned water storage tank to the above-mentioned water-heating tank, and a detection section for making a judgment as to whether water supply to the water storage tank is necessary or not by detecting the state of the liquid stored in the above-mentioned water storage tank.

The above-mentioned water supply section is driven and controlled depending on-the judgment by the above-mentioned detection section as to whether water supply to the water storage tank is necessary or not. The detection section different from the water supply section detects the state of the liquid held in the water storage tank and makes the judgment as to whether water supply to the water storage tank is necessary or not, and water is supplied from the water storage tank to the water-heating tank. Hence, the operation of the water supply section is restricted to a minimum necessity, whereby noise is prevented and durability is improved in the water supply section.

In an electric water heater in accordance with claim 9 of the invention, when the lid of the water storage tank is opened and closed, the detection section detects the state of the liquid held in the water storage tank and makes a judgment as to whether water supply to the water storage tank is necessary or not. After the detection of opening and closing of the lid of the water storage tank, the water supply section is driven and controlled, and therefore, the operation of the water supply section is restricted to a minimum necessity, whereby noise is prevented and durability is improved in the water supply section.

In an electric water heater in accordance with claim 10 of the invention, when the water storage tank itself is attached and detached, the detection section detects the state of the liquid held in the water storage tank and makes a judgment as to whether water supply to the water storage tank is necessary or not. After the attaching and detaching of the water storage tank itself is detected, the water supply section is driven and controlled, and therefore, the operation of the water supply section is restricted to a minimum necessity, whereby noise is prevented and durability is improved in the water supply section.

In an electric water heater in accordance with claim 11 of the invention, the water supply section is driven and controlled when the attaching and detaching operation time of the water storage tank itself or the opening and closing operation time of the water storage tank lid is a predetermined time or more. Since the water supply section is not operated when the water storage tank itself is attached and detached, when the water storage tank lid is opened and closed, or the like, by mistake, the operation of the water supply section is restricted to a minimum necessity, and noise is prevented and durability is improved in the water supply section.

An electric water heater in accordance with claim 12 of the invention comprises a water-heating tank, a water storage tank for holding liquid, a water supply section for supplying the water in the above-mentioned water storage tank to the above-mentioned water-heating tank, and a water supply switch for driving and controlling a water supply pump by its operation after the necessity of water supply to the water storage tank is detected. Since water is supplied from the water storage tank to the water-heating tank when the water supply section is operated, the operation of the water supply section is restricted to a minimum necessity, and noise is prevented and durability is improved in the water supply section.

Furthermore, the present invention is intended to provide an electric water heater wherein only the required amount of liquid is heated and warmed, and the other amount of liquid is stored in another container, whereby power consumption is reduced, it is not necessary to exercise caution for hot water and steam during water pouring, and excessive water supply can be prevented.

In the electric water heater in accordance with the present invention, the water storage tank for holding liquid to be supplied to the water-heating container is provided separately from the water-heating container. A water supply port through which water is supplied from the water storage tank to the water-heating container is provided below the upper end of the water-heating container, and the liquid in the water storage tank is poured into the water-heating container from this water supply port.

Only the required amount of liquid is heated and warmed in the water-heating container, and the other amount of liquid is stored in the water storage tank. Hence, power consumption is reduced, it is not necessary to exercise caution for hot water and steam during water pouring, and excessive water supply can be prevented.

An electric water heater in accordance with claim 13 of the invention comprises a water-heating container, a heating section for heating the liquid in the water-heating container, and a water storage tank for storing liquid to be supplied to the water-heating container. A water supply port through which water is supplied from the water storage tank to the water-heating container is provided below the upper end of the water-heating container, and the liquid in the water storage tank is poured into the water-heating container from this water supply port. Only the required amount of liquid is heated and warmed in the water-heating container, and the other amount of liquid is stored in the water storage tank. Hence, power consumption is reduced, it is not necessary to exercise caution for hot water and steam during water pouring, and excessive water supply can be prevented.

Furthermore, in an electric water heater in accordance with claim 14 of the invention, the water supply port is positioned above the substantial full-level position of the water-heating container. Hence, it is possible to obtain effects wherein water can be supplied smoothly to the water-heating container and reverse flow from the water-heating container to the water supply port is prevented.

Furthermore, in an electric water heater in accordance with claim 15 of the invention, a projection section is provided on the side of a body equipped with the water-heating container, and this projection is provided with the water supply port. Hence, the circumference of the water supply port can be covered by the water storage tank. At the time of excessive supply, the liquid overflowing from the water supply port can be returned again to the water storage tank, whereby an effect of preventing outflow of the liquid is obtained.

Furthermore, in an electric water heater in accordance with claim 16 of the invention, a packing is provided at the water supply port so as to make contact with the connection section of the water storage tank. Hence, the close contact performance between the water supply port and the water storage tank is improved, and liquid can be supplied securely to the water-heating container, whereby it is possible to obtain an effect of preventing water leakage from the water supply port.

Furthermore, in an electric water heater in accordance with claim 17 of the invention, a packing is provided at the connection section of the water storage tank connected to the water supply port. Hence, the close contact performance between the water supply port and the water storage tank is improved, and liquid can be supplied securely to the water-heating container, whereby it is possible to obtain an effect of preventing water leakage from the water supply port.

Furthermore, in an electric water heater in accordance with claim 18 of the invention, a water supply pump supplies water from the water storage tank to the water-heating container. Hence, water can be supplied smoothly to the water-heating container, and the amount, timing, etc. of water supply can be controlled by controlling the driving of the water supply pump.

Furthermore, in an electric water heater in accordance with claim 19 of the invention, the highest part of the water feed passage from the water storage tank to the water supply port of the water-heating container is positioned above the water supply port. Hence, it is possible to prevent the liquid in the water storage tank from flowing to the water supply port owing to the siphon phenomenon.

Furthermore, in an electric water heater in accordance with claim 20 of the invention, the water supply port is provided above the full level of the water storage tank. Hence, it is possible to prevent the liquid in the water storage tank from flowing to the water supply port owing to the siphon phenomenon, and in the case when a predetermined amount or more of water is supplied to the water-heating container, extra water can be returned smoothly to the water storage tank side.

Furthermore, in an electric water heater in accordance with claim 21 of the invention, an engagement section to be engaged with the water storage tank is provided on the projection section. Hence, the water storage tank is securely attached to the body, and the close contact performance between the water supply port and the water storage tank is improved, whereby an effect of preventing water leakage from the water supply port can be obtained.

Furthermore, in an electric water heater in accordance with claim 22 of the invention, the drain port of the water supply passage is connected from the water supply port to the water-heating container via the water supply passage. A low passage positioned below the drain port is provided at a part of the water supply passage. Hence, the supplied liquid stays in the part of the water supply passage, whereby the water supply passage is closed completely. In addition, it is possible to obtain an effect wherein steam generated when the liquid in the water-heating container is boiled can be prevented from being discharged from the water supply port.

Furthermore, in an electric water heater in accordance with claim 23 of the invention, a stop valve for preventing liquid from flowing out at the time of turnover is provided in the water supply passage through which liquid is supplied from the water storage tank to the water-heating container. Hence, when the water-heating container is turned over, liquid can be prevented from flowing out.

Furthermore, the present invention is intended to provide an electric water heater wherein the temperature of the hot water to be supplied is not lowered even when the hot water is discharged intermittently in a short time.

In order that the above-mentioned object is attained, in the electric water heater in accordance with the present invention, water supply by the water supply section is prohibited within a predetermined time period from the time when it is detected by the water amount detection section that the amount of the hot water being warmed in the water-heating container is smaller than the water amount at which water supply should be started.

Hence, in the case that hot water is discharged intermittently in a short time, even when it is detected that the amount of hot water is smaller than the water amount at which water supply should be started as a result of the hot water discharge of the last time, water supply is not carried out immediately. Hence, the temperature of the hot water warmed in the water-heating container does not lower. If the next hot water discharge is carried out within the predetermined time period, hot water having a temperature equivalent to that of the hot water discharged the last time is obtained.

An electric water heater in accordance with claim 24 of the invention comprises a water-heating container for heating and warming hot water, a heating section for heating the above-mentioned water-heating container, a water amount detection section for detecting the amount of water in the above-mentioned water-heating container, a water discharge section for discharging the hot water stored inside the above-mentioned water-heating container, a water supply container for holding water, and a water supply section for supplying the water of the above-mentioned water supply container to the above-mentioned water-heating container. Water supply by the above-mentioned water supply section is prohibited within a predetermined time period from the time when it is detected by the above-mentioned water amount detection section that the amount of hot water being warmed in the above-mentioned water-heating container is smaller than the water amount at which water supply is started. Hence, in the case that hot water is discharged intermittently in a short time, even when it is detected that the amount of hot water is smaller than the water amount at which water supply is started as a result of the hot water discharge of the last time, water supply is not carried out immediately. Hence, the temperature of the hot water in the water-heating container does not lower. If the next hot water discharge is carried out within the predetermined time period, the temperature drop of hot water to be discharged can be prevented, and hot water having a temperature equivalent to that of the hot water discharged the last time can be used.

In an electric water heater in accordance with claim 25 of the invention, the above-mentioned predetermined time period can be changed as desired by user's operation. Hence, even if the usage state of hot water is different depending on the convenience of each user, a problem wherein water supply is carried out immediately before usage and heating is started is resolved.

In an electric water heater in accordance with claim 26 of the invention, when the user carries out lock release operation and hot water discharge operation to operate the hot water discharge section within the above-mentioned predetermined time period, the above-mentioned predetermined time period is extended. Hence, even in the case that hot water discharge is repeated intermittently in a short time, the water supply prohibition time is extended each time hot water discharge is carried out. Even if hot water discharge is carried out repeated intermittently afterward, water supply is not carried out, whereby hot water having a temperature equivalent to that of the hot water discharged the last time can be obtained. In other words, the temperature drop of hot water to be discharged can be prevented continuously.

In an electric water heater in accordance with claim 27 of the invention, in the case when the water amount detection section detects that the amount of hot water in the water-heating container is less than the water amount at which heating by the heating section is stopped, the extension of the above-mentioned predetermined time period is stopped, and the water supply section is operated. Hence, when the hot water in the water-heating container is reduced and when it is detected that water replenishment is necessary, water supply is started immediately even when the above-mentioned predetermined time period is being extended. Hence, water supply and heating are carried out immediately without requiring unnecessary waiting in a state wherein there is no remaining amount of hot water.

An electric water heater in accordance with claim 28 of the invention further comprises a water supply advance notice display section for displaying, within the above-mentioned predetermined time period, that water supply starts soon. Hence, the user can visually recognize that water supply is started. Preliminary preparations can be done, for example, hot water can be used up before the temperature of the hot water is lowered by water supply, or water replenishment to the above-mentioned water supply container is carried out so as to be prepared for automatic water supply, without being perplexed with the sudden start of automatic water supply, whereby usability is improved.

The present invention is intended to provide an electric water heater capable of minimizing the waiting time required until boiling by supplying the amount of water required in the immediate future to the water supply container and heating the water.

The electric water heater in accordance with the present invention is configured so that the amount of water in the water-heating container can be adjusted as desired. With this configuration, only the amount of water required in the immediate future can be heated. Hence, the waiting time required until boiling can be minimized. Since the amount of water required in the immediate future should only be supplied, heated and warmed, it is not necessary to use extra electric power to heat and warm extra water not required An electric water heater in accordance with claim 29 of the invention comprises a water-heating container for heating and warming hot water, a water supply container for holding water, and a water supply section for supplying the water of the above-mentioned water supply container to the above-mentioned water-heating container, and is configured so that the amount of water in the above-mentioned water-heating container can be adjusted as desired. Hence, only the amount of water required in the immediate future can be heated, whereby waiting time can be minimized and convenience is improved.

An electric water heater in accordance with claim 30 of the present invention comprises a water-heating container for heating and warming hot water, a heating section for heating the above-mentioned water-heating container, a water amount detection section for detecting the amount of water in the above-mentioned water-heating container, a water supply container for holding water, and a water supply section for supplying the water in the above-mentioned water supply container to the above-mentioned water-heating container. The above-mentioned water supply section can carry out automatic water supply control based on the amount of water detected by the above-mentioned water amount detection section or manual water supply control based on a water supply switch operated by the user. In an ordinary usage state, troublesome water supply is carried out automatically to the full level. When it is necessary to heat a small amount of water quickly, only the required amount of water can be supplied manually and heated, whereby convenience is improved.

An electric water heater in accordance with claim 31 of the invention is configured so that the user stops and starts the automatic water supply control of the water supply section by using the water supply switch in the configuration in accordance with claim 30. Hence, with the simple configuration, the amount of water to be supplied can be adjusted freely.

An electric water heater in accordance with claim 32 of the invention is configured so that the automatic water supply control of the water supply section in the configuration in accordance with claim 31 cannot be stopped by using the water supply stop switch when the amount of water detected by the water amount detection section is the water amount at which the heating section is required to be stopped. This can eliminate an inconvenience wherein the whole operation of the water heater is stopped if water supply is stopped when the amount of water is the amount at which heating should be stopped.

An electric water heater in accordance with claim 33 of the invention is configured so that the stop of the automatic water supply control is cancelled automatically in the configuration in accordance with claim 31 or 32. Hence, automatic control is carried out so as not to stop the whole operation of the water heater in the heating stop region, thereby resolving the inconvenience.

An electric water heater in accordance with claim 34 of the invention is configured so that when the automatic water supply control based on the amount of water detected cannot be stopped or started by the water supply switch in the configuration in accordance with claims 30 to 33, an invalid acceptance notice is performed, and the operation of the water supply switch is not accepted. Hence, safety and operability are improved.

An electric water heater in accordance with claim 35 of the invention comprises a control switching section for switching the control of the water supply section between automatic water supply control and manual water supply control in the configuration in accordance with claim 30. It is configured so that the operation of the water supply switch is valid when the above-mentioned control switching section selects the above-mentioned manual water supply control. Hence, it becomes clear that which water supply control is carried out at present, whereby operability is improved.

An electric water heater in accordance with claim 36 of the invention is configured so that the water supply section can be driven continuously without keeping operating the above-mentioned water supply switch. Since the water supply switch is not required to be kept operated for a long time, operability is improved.

An electric water heater in accordance with claim 37 of the invention comprises a display section capable of distinguishing between the operation state at the time of the automatic water supply control and the operation state at the time of the manual water supply control of the water supply section, whereby visual recognizability and convenience are improved.

THE BEST MODE FOR CARRYING OUT THE INVENTION

Preferred embodiments of an electric water heater in accordance with the present invention will be described below referring to the accompanying FIGS. 1 to 17.

[Embodiment 1]

Figure 1:
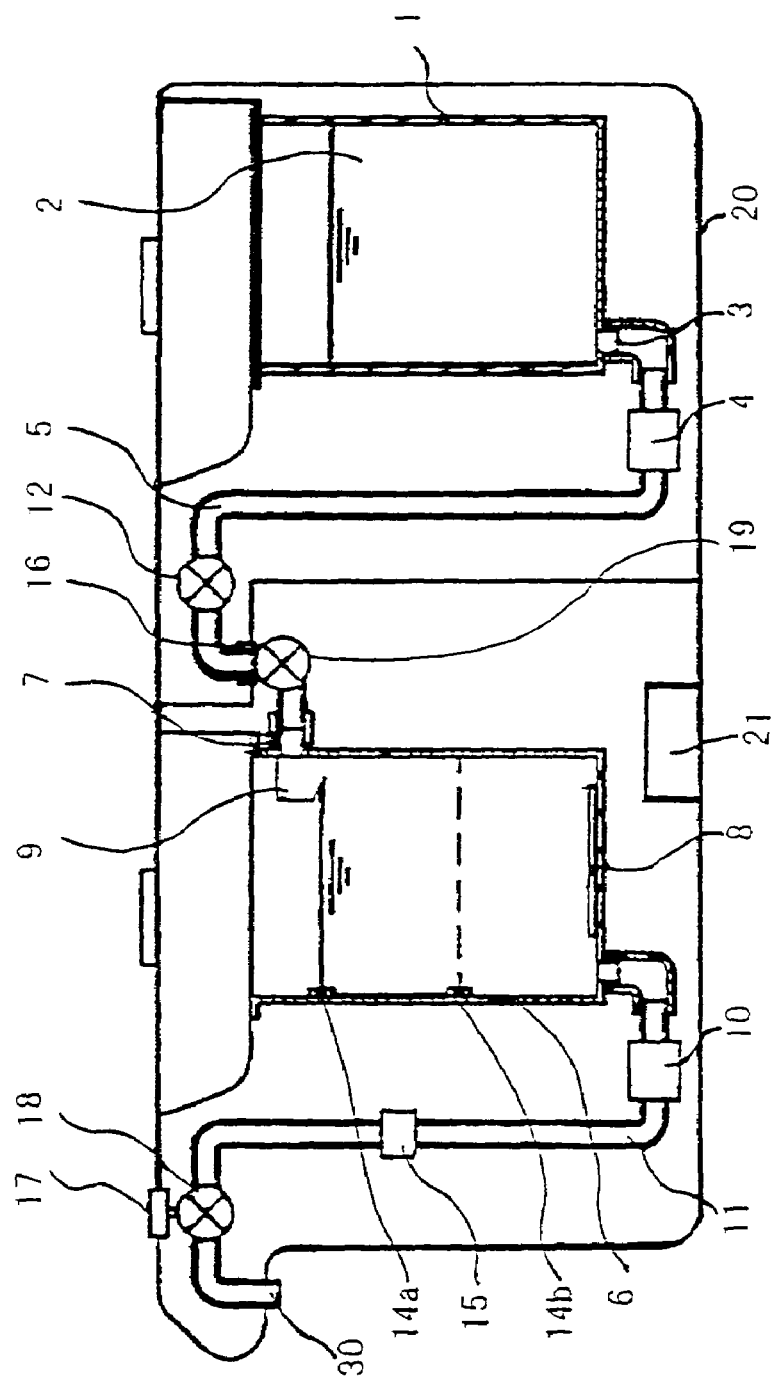
FIG. 1 is a cross-sectional view of an electric water heater being common in embodiments 1 to 3 of the present invention.

An electric water heater in accordance with an embodiment 1 of the present invention will be described below referring to FIG. 1. FIG. 1 is a view showing the overall configuration of the electric water heater in accordance with this embodiment.

In the figure, water 2 held in a water storage container 1 is guided from a liquid outlet 3 provided at the bottom section of the water storage container 1 to a pump 4 serving as a water conveyance section. The water 2 is fed through a supply passage 5 by the pump 4 and supplied from a liquid inlet 7 provided on the side of a water-heating container 6 into the water-heating container 6. The liquid inlet 7 should only be positioned above the full level lines of the water-heating container 6 and the water storage container 1, and may be provided in a lid for covering the upper section of the water-heating container 6, for example. A check valve 12 serving as checking means is provided in the supply passage 5 so that water does not flow reversely from the water-heating container 6 to the water storage container 1 when the level of the water in the water-heating container 6 rises close to the liquid inlet 7.

The water 2 supplied into the water-heating container 6 is heated to a desired temperature by a heater 8 serving as a heating section and provided at the bottom section of the water-heating container 6. When the user presses a hot water discharge switch 17, a pump 10 serving as a hot water discharge section is operated, and hot water is discharged from a discharge port 30 to the outside of a main body 20 through a hot water discharge passage 11. In the hot water discharge passage 11, a turnover outflow prevention valve 18 for securely closing the passage at the time of the turnover or the like of the water-heating container 6 is provided. This turnover outflow prevention valve 18 should only be structured so as to open in conjunction with the hot water discharge switch 17 and so as to securely prevent outflow of hot water when hot water discharge from the water-heating container 6 is not desired.

When hot water is discharged to the outside of the main body 20 and the amount of hot water in the water-heating container 6 decreases to a predetermined amount or less, a lower water level sensor 14*b* detects this. As a result, a control circuit 21 operates the pump 4 to supply the water 2 in the water storage container 1 into the water-heating container 6. When an upper water level sensor 14*a* detects that the level of the water in the water-heating container 6 has risen to the full level line, the control circuit 21 stops the operation of the pump 4 to stop water supply.

Between the water storage container 1 and the water-heating container 6, a connection section 16 is provided at the boundary section of the supply passage 5 and the liquid inlet 7 or in the supply passage 5. With this connection section 16, disconnection or connection can be carried out between the supply passage 5 and the water-heating container 6 or between the mutual portions of the supply passage 5. The connection section 16 may be provided in the vicinity of the liquid outlet 3 placed at the boundary of the supply passage 5 and the water storage container 1.

With this configuration, while the total amount of water to be heated, that is, the total amount of water in the water-heating container 6 and the water storage container 1, is maintained so as to be equivalent to that of a conventional product, the amount of water to be heated (hereafter referred to as a water heating amount) or the-amount of hot water to be warmed (hereafter referred to as a water warming amount) at one time is reduced, and the water heating amount is subdivided, whereby power consumption during warming can be reduced. Since the water storage container 1 being independent is provided, water supply can be carried out conveniently regardless of the state of the water-heating container 6 (during heating or warming). In addition, since a stop valve 19 is provided in the supply passage 5 for connecting the water storage container 1 to the water-heating container 6, hot water is prevented from flowing reversely from the water-heating container 6 even when the water storage container 1 is removed.

In this embodiment, both the water-heating container 6 and the water storage container 1 are provided inside the main body 20, however, the water storage container 1 may be provided outside the main body 20, instead of being provided inside the main body 20. In this case, the supply passage 5 is provided for each of the water storage container 1 and the main body 20. The water storage container 1 may be connected to the supply passage 5 provided for the main body 20 in the vicinity of the liquid outlet 3.

As another method of removing the water storage container 1, a valve having a watertight fitting section made so as to slide with the supply passage 5 may be provided at the liquid outlet 3, so that the water passage of the liquid outlet 3 is closed when the water storage container 1 is lifted upward. In this case, by providing a water passage closing valve on the side of the supply passage 5, the water storage container 1 can be attached and detached freely.

In addition, connection may be carried out by intervening an elastic material provided around the end face of the opening section of the supply passage at the connection section 16 of the supply passage 5 and by pressing one end face of the supply passage against the other end face so that water leakage does not occur.

With this configuration, even when the water-heating container 6 is in the water heating state or the water warming state, the water storage container 1 can be removed for water supply or for cleaning of the water storage container 1. The water-heating container 6 can be used as a water heater even when it is used independently.

The water 2 supplied through the supply passage 5 by the pump 4 serving as a water conveyance device is supplied from the liquid inlet 7 of the water-heating container 6 disposed above the full level line of the water storage container 1 into the water-heating container 6. Since the liquid inlet 7 is provided above the full level line of the water storage container 1, the siphon phenomenon wherein water is supplied continuously owing to the head difference between the water level of the water storage container 1 and that of the water-heating container 6 and the overflow of the water in the water-heating container 6 beyond the full level line are prevented from occurring.

The water 2 lifted to a position higher than the full level line of the water-heating container 6 by the pump 4 is supplied into the water-heating container 6 through the liquid inlet 7 by using free fall.

With this configuration, when water is directly poured into the water-heating container 6, or even if the level of the water in the water-heating container 6 rises close to the liquid inlet 7 during boiling, reverse flow of hot water from the water-heating container 6 to the water storage container 1 can be prevented. In addition, since the water 2 is supplied ultimately by the free fall, it can be guided smoothly into the water-heating container 6.

[Embodiment 2]

Figure 2:
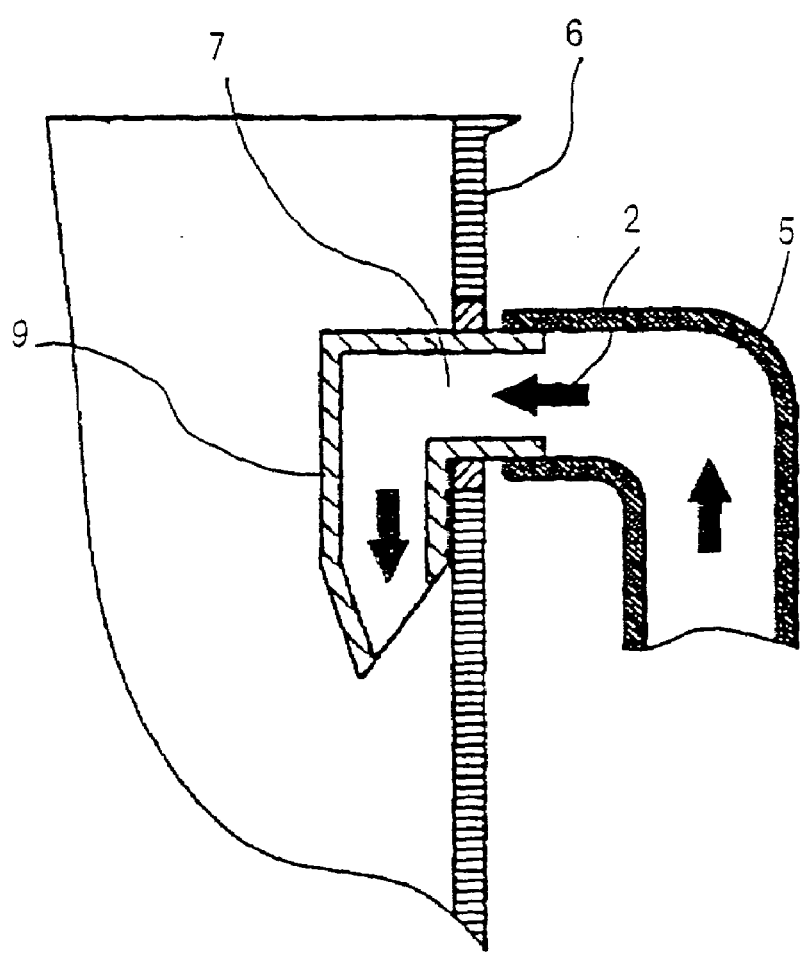
FIG. 2 is a cross-sectional view of a relevant part showing the structure in the vicinity of the liquid guide section of the electric water heater in accordance with embodiment 2 of the present invention.

FIG. 2 is a cross-sectional view of a relevant part showing the liquid guide section of an electric water heater in accordance with an embodiment 2 of the present invention. In the figure, the liquid 2 indicated by arrows and having passed through the supply passage 5 is guided to the inner wall face of the water-heating container 6 by a liquid guide section 9 provided on the inner wall face side of the water-heating container 6 in the vicinity of the liquid inlet 7 and directly poured along the inner wall face.

With this structure, noise during the scattering and pouring of the water 2 can be reduced in comparison with the case when the water is directly discharged from the liquid inlet 7 and poured along a parabola. The liquid guide section 9 may be provided by partially processing the water-heating container 6.

[Embodiment 3]

Figure 3:
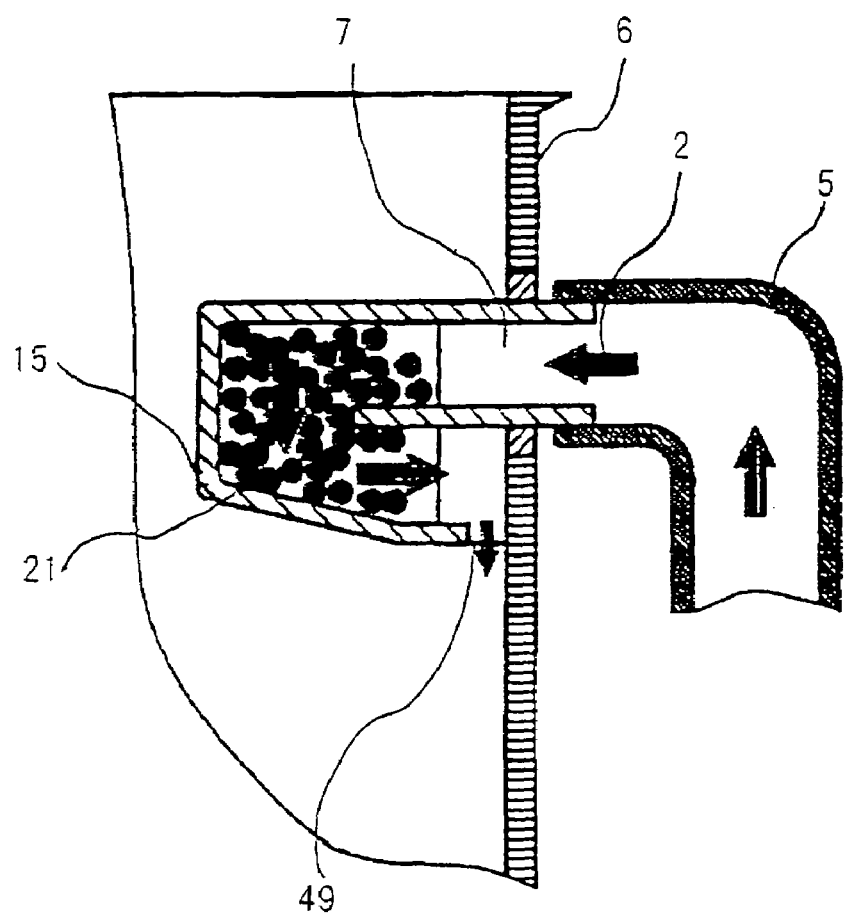
FIG. 3 is a cross-sectional view of a relevant part showing the structures in the vicinity of the liquid guide section and the reforming section of the electric water heater in accordance with embodiment 3 of the present invention.

FIG. 3 is a cross-sectional view of a relevant part showing the liquid guide section of an electric water heater in accordance with an embodiment 3 of the present invention. In FIG. 1 and FIG. 3, a reforming section 15 is provided at the liquid inlet 7. The water 2 supplied from the water storage container 1 makes contact with mineral balls 21 serving as reforming material packed inside the reforming section 15, whereby minerals are added to the water 2.

The reforming section 15 may be configured so as to be provided inside with activated carbon that removes unnecessary chlorine when the water 2 passes through the mineral balls 21. In addition, the reforming section 15 may be provided with a porous mesh filter to remove large particulate substances from the water 2.

With the reforming section 15, various substances can be removed and added. A liquid guide section 49 may be integrated with a part of the case of the reforming section 15 as shown in FIG. 3.

In accordance with the above-mentioned embodiments 1 to 3 of the present invention, the water storage container which is separated from the water-heating container is provided so as to be attached to and detached from the water-heating container as desired. Hence, it is possible to provide a water heater wherein a water heating amount or a water warming amount to be heated at one time is reduced, power consumption during warming is reduced, and water supply is carried out conveniently.

[Embodiment 4]

Figure 4:
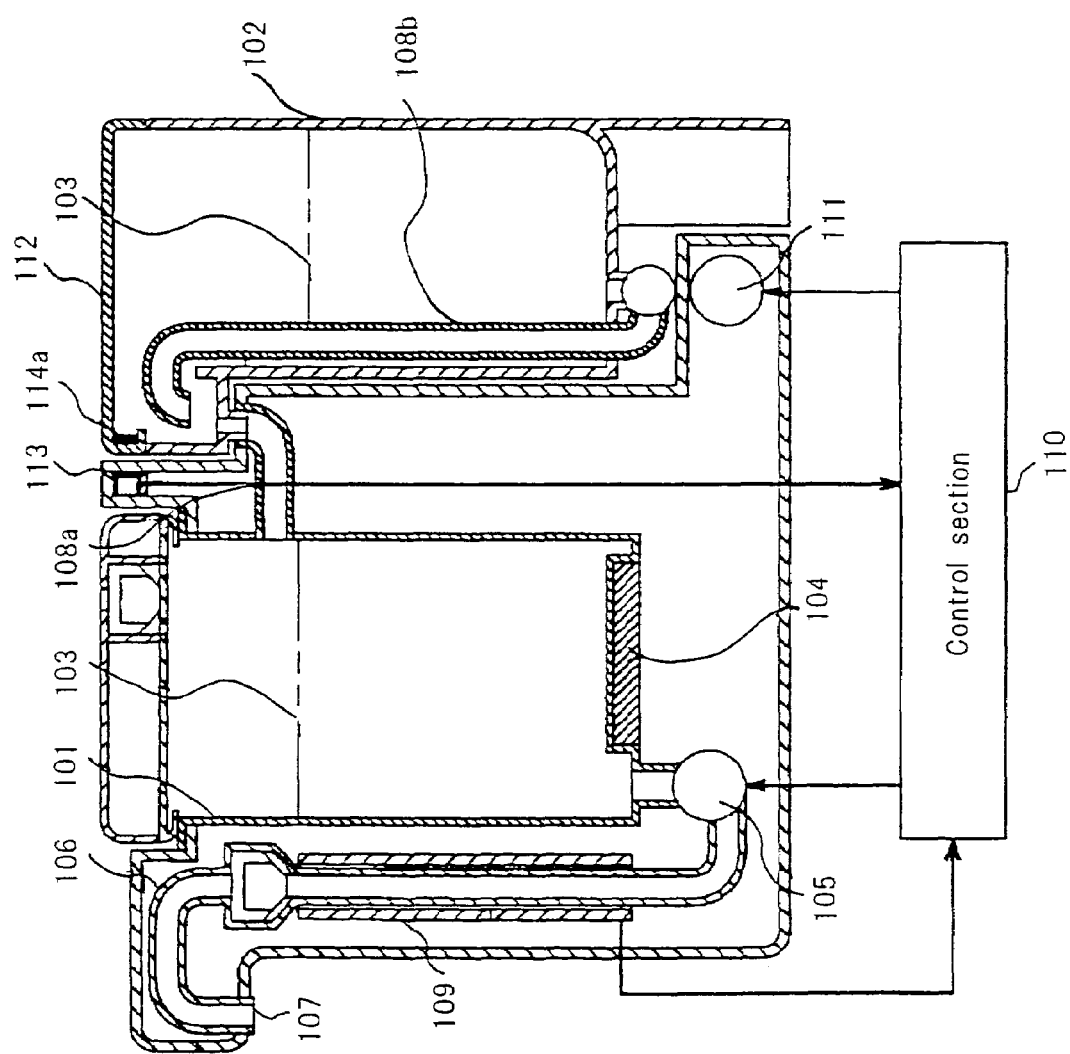
FIG. 4 is a vertical cross-sectional view showing an electric water heater being common in embodiments 4 to 6 of the present invention.

FIG. 4 is a cross-sectional view showing an electric water heater in accordance with an embodiment 4 of the present invention.

In the figure, a necessary amount of liquid 103 is held in a water-heating tank 101, and heated by a heating section 104 so as to be heated and warmed. The liquid 103 heated and warmed is discharged to the outside from a discharge port 107 through a discharge passage 106 by a discharge pump 105 serving as a discharge section.

A water storage tank 102 stores the water 103 to be supplied to the water-heating tank 101, and is connected to the water-heating tank 101 via water supply passages 108a and 108b. Since the water supply passages 108a and 108b are divided in the middle, the water storage tank 102 can be attached to and detached from the water-heating tank 101. The water storage tank 102 has a water storage tank lid 112 that can be opened and closed.

The amount of liquid in the water-heating tank 101 is detected by a water level sensor 109 provided in the water-heating tank 101 or the discharge passage 106. When the level of the water in the water-heating tank 101 lowers, this is detected by the water level sensor 109. According to the detection output of the water level sensor 109, a control section 110 operates a water supply pump 111 serving as a water supply section and provided in the water supply passage 108b to supply water from the water storage tank 102 to the water-heating tank 101. The water supply pump 111 comprises a drive section and an impeller section, separated by a magnetic coupling system, for example.

When the water in the water storage tank 102 is exhausted during water supply from the water-storage tank 102 to the water-heating tank 101, the load of the water supply pump 111 being driven lightens. Water exhaustion is detected by the lightening of the load, and water supply is stopped. After the water exhaustion is detected, another detection section described later detects the state of the liquid held in the water storage tank 102, and makes a judgment as to whether water supply to the water storage tank 102 is carried out or not. According to the judgment about water supply by this detection section, the control section 110 controls the driving of the water supply pump 111. In this embodiment, the opening and closing operation of the water storage tank lid 112 is detected, and when the opening and closing operation has detected, it is judged that water is supplied to the water storage tank 102, hence, the water supply pump 111 is operated again, and water is supplied from the water storage tank 102 to the water-heating tank 101.

The detection section for detecting the opening and closing operation of the above-mentioned water storage tank lid 112 will be described below. In this embodiment, a reed switch 113a is provided on the main body side having the water-heating tank 101, and a magnet 114a is mounted on the water storage tank lid 112. The opening and closing operation of the water storage tank lid 112 is detected by the ON or OFF operation of the reed switch 113a. As the detection section for detecting the necessity or nonnecessity of water supply to the water storage tank 102, a water level sensor for detecting the level of water in the water storage tank 102, a weight sensor for detecting the weight of the water storage tank 102, a temperature sensor for detecting the temperature of water, etc. may also be used for detection, instead of the detection of the opening and closing operation of the water storage tank lid 112.

Not only the opening and closing operation of the water storage tank lid 112 but also the attaching and detaching operation of the water storage tank 102 itself similarly operates the reed switch 113a, whereby water supply to the water storage tank 102 can be detected.

With the above-mentioned configuration, for example, after the opening and closing operation of the water storage tank lid 112 is detected, the control section 110 controls the driving of the water supply pump 111 serving as a water supply section. Hence, idle running of the water supply pump 111 is prevented, and its operation is restricted to a minimum necessity, whereby noise is prevented and durability is improved.

[Embodiment 5]

Embodiment 5 of the present invention will be described referring to FIG. 4.

In the present embodiment 5, only when the time period during which the water storage tank lid 112 is opened continues for a predetermined time period or more (five seconds or more, for example), the water supply pump 111 is operated and water is supplied from the water storage tank 102 to the water-heating tank 101.

For example, when the water storage tank lid 112 is opened and closed or removed temporarily (less than five seconds) by mistake, the water supply pump 111 is not operated. Furthermore, as a detection section, a device for detecting the attaching and detaching operation of the water storage tank 102 itself may be used.

According to the present embodiment, when the water storage tank lid is opened and closed or when the water storage tank itself is attached and detached temporarily by mistake, the water supply section is not operated. Hence, the operation of the water supply pump 111 is restricted to a minimum necessity, whereby noise is prevented and durability is improved in the water supply pump 111.

[Embodiment 6]

Next, an electric water heater in accordance with embodiment 6 of the present invention will be described referring to FIG. 4.

In the present embodiment 6, after the opening and closing operation of the water storage tank lid 112 or the attaching and detaching operation of the water storage tank 102 itself is detected by the reed switch 113a, the water supply pump 111 serving as a water supply section is operated, and it is confirmed that water has been supplied securely into the water storage tank 102, depending on the magnitude of the load of the water supply pump 111.

According to the configuration of the present embodiment, after the opening and closing operation of the water storage tank lid 112 or the attaching and detaching operation of the water storage tank 102 itself is detected, the water supply pump 111 is operated, hence the operation of the water supply pump 111 is restricted to a minimum necessity, whereby noise is prevented and durability is improved.

[Embodiment 7]

Figure 5:
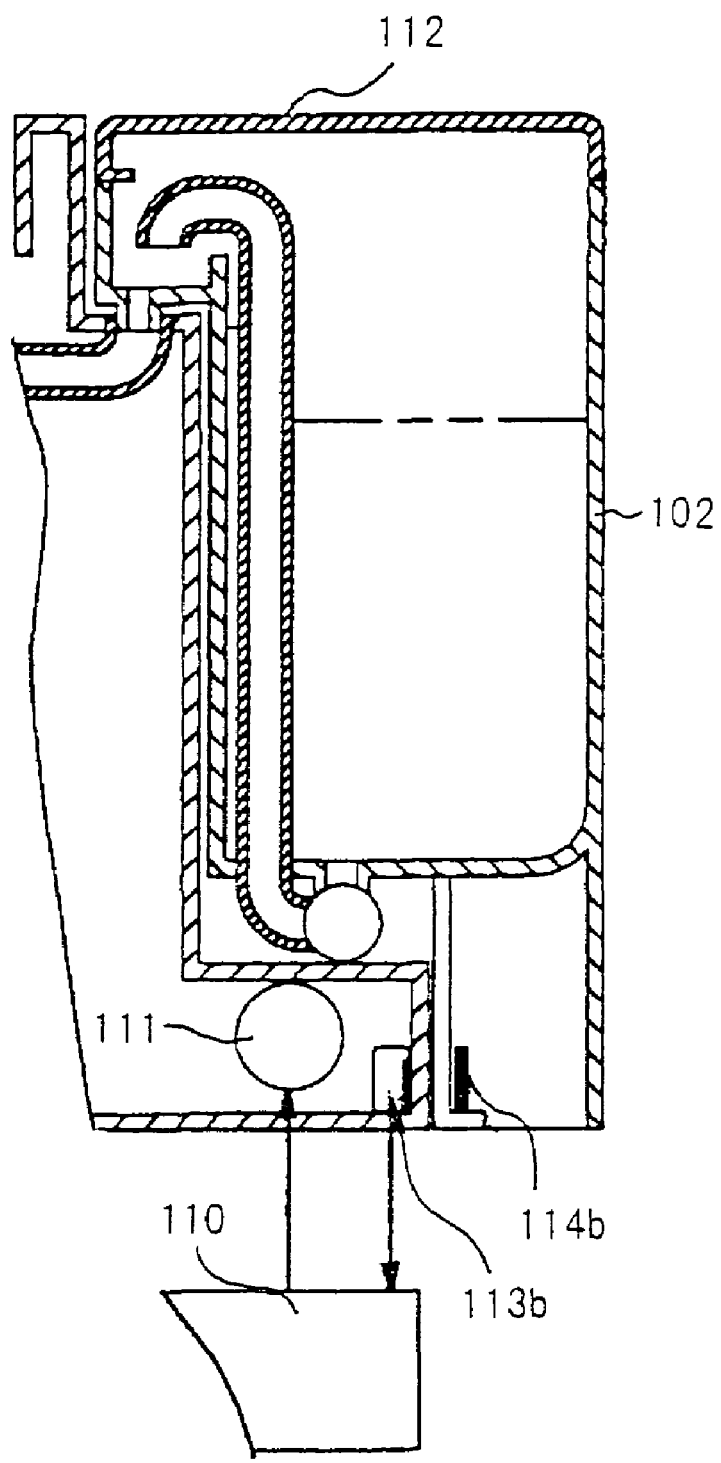
FIG. 5 is a cross-sectional view of a relevant part showing an electric water heater in accordance with embodiment 7 of the present invention.

Next, an electric water heater in accordance with embodiment 7 of the present invention will be described referring to FIG. 5, a cross-sectional view of a relevant part.

In the present embodiment 7, after the fact that the water storage tank 102 became empty was detected depending on the magnitude of the load of the water supply pump 111, in the case when the attaching and detaching operation of the water storage tank 102 has detected by a reed switch 113b serving as a detection section, it is judged that water has been supplied to the water storage tank 102. The water supply pump 111 is then driven again, and water is supplied from the water storage tank 102 to the water-heating tank 101.

In the present embodiment, the reed switch 113b serving as a detection section is provided at the lower section of the main body having the water-heating tank 101. The configuration and operation of the reed switch 113b are the same as those of the above-mentioned embodiment 6. A magnet 114b facing the reed switch 113b is mounted at the lower section of the water storage tank 102, and the attaching and detaching operation of the water storage tank 102 is judged depending on the ON or OFF operation of this reed switch 113b.

According to the configuration of this embodiment, the operation of the water supply pump 111 is restricted to a minimum necessity, whereby noise is prevented and durability is improved.

[Embodiment 8]

Figure 6:
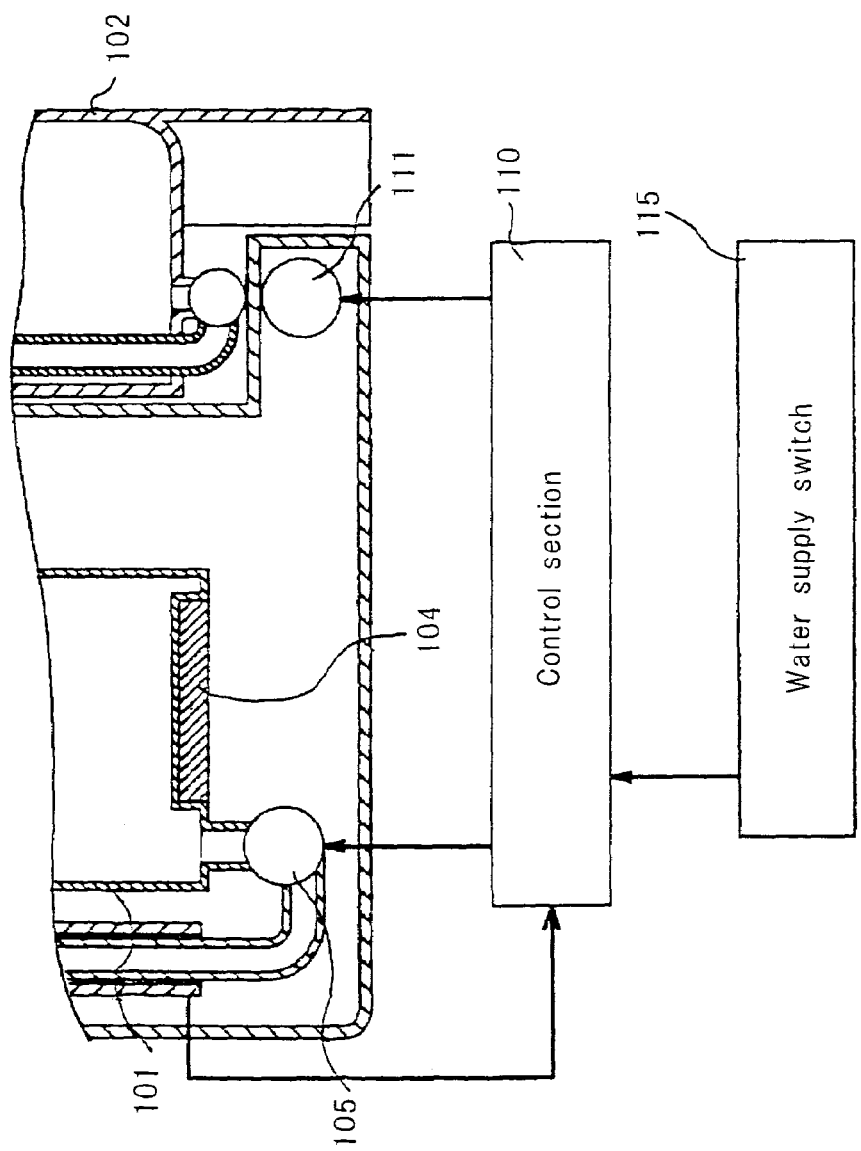
FIG. 6 is a cross-sectional view of a relevant part showing an electric water heater in accordance with embodiment 8 of the present invention.

Next, an electric water heater in accordance with an embodiment 8 of the present invention will be described referring to a cross-sectional view of a relevant part of FIG. 6.

The electric water heater in accordance with the present embodiment comprises a water-heating tank 101, a water storage tank 102 which can be attached to and detached from the water-heating tank 101 and stores liquid, and a water supply pump 111 serving as a water supply section for supplying the water in the above-mentioned water storage tank 102 to the above-mentioned water-heating tank 101. After the necessity of water supply to the water storage tank 102 is detected, the water supply pump 111 is driven and controlled by the operation of a water supply switch 115. In this embodiment, after the fact that the water storage tank 102 is empty is detected depending on the change of the load of the water supply pump 111, water is supplied from the water storage tank 102 to the water-heating tank 101 only by pressing the water supply switch 115.

Incidentally, the detection as to whether water supply to the water storage tank 102 is necessary or not is not only particularly limited to the detection of the empty state depending on the change of the load of the water supply pump 111 but may be carried out otherwise by, providing the respective detection sections shown in the above-mentioned respective embodiments.

According to the embodiment 8, the water supply pump 111 is not operated unless the water supply switch 115 is operated by the user. Hence, the operation of the water supply pump 111 is restricted to a minimum necessity, whereby noise is prevented and durability is improved in the water supply pump 111.

According to the electric water heaters of the above-mentioned embodiments 4 to 8 of the present invention, the driving control of the water supply section for supplying the liquid in the water storage tank to the water-heating tank can be restricted to a minimum necessity. Hence, noise in the water supply section at the time when a judgment as to whether water supply to the water storage tank is necessary or not is eliminated and the durability of the water supply section is improved.

[Embodiment 9]

An electric water heater in accordance with an embodiment 9 of the present invention will be described referring to FIG. 7.

Figure 7:
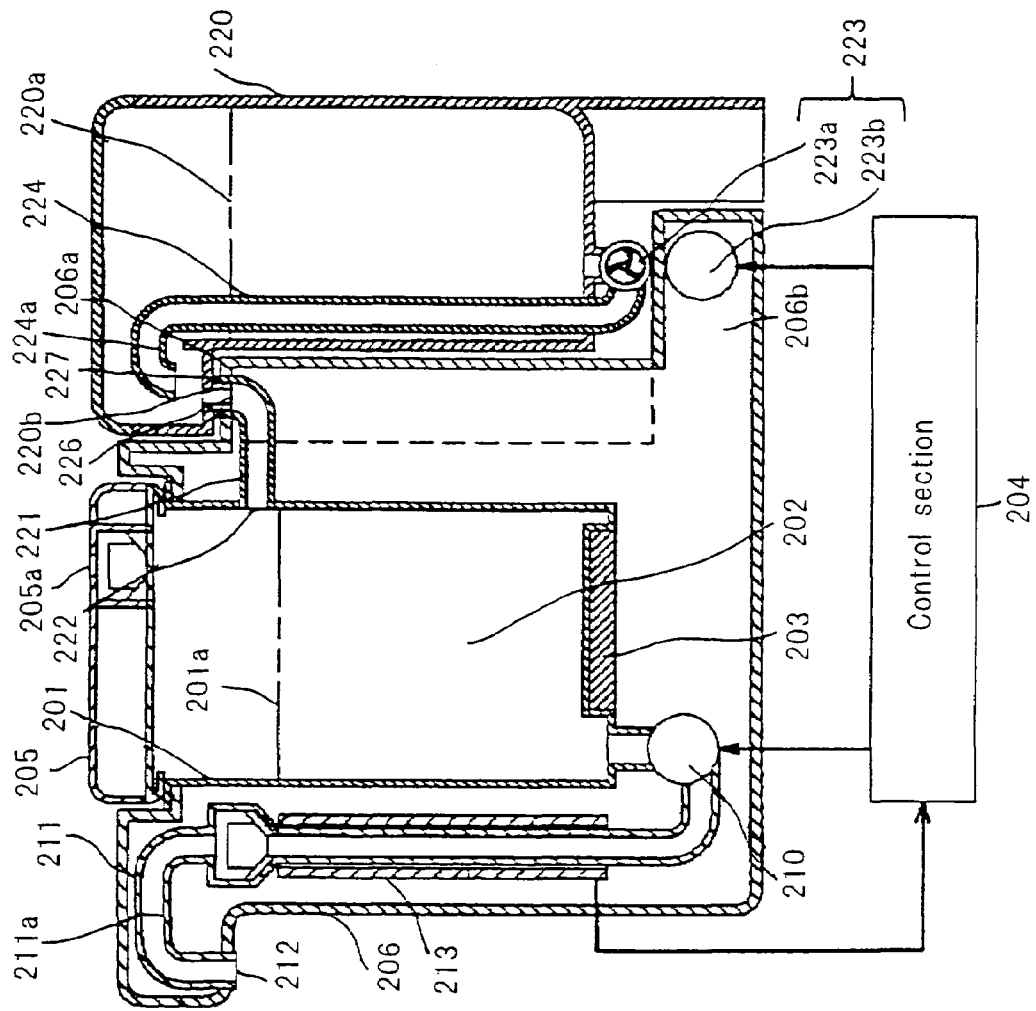
FIG. 7 is a vertical cross-sectional view showing an electric water heater being common in embodiments 9 to 12 and 14 to 16 of the present invention.

As shown in FIG. 7, liquid 202 held in a water-heating container 201 is heated to a predetermined temperature by a heating element 203 serving as a heating section. The liquid 202 heated to a predetermined temperature is discharged from a discharge port 212 to the outside of a main body 206 by a pump 210 serving as a discharge section. The upper opening section of the water-heating container 201 is covered with a lid 205. The lid 205 is provided with a steam port 205a for guiding steam generated in the water-heating container 201 to the outside of the main body 206.

A water storage tank 220 for holding the liquid 202 to be supplied to the water-heating container 201 is provided separately from the water-heating container 201. The water storage tank 220 is provided so as to be attached to and detached from the main body 206. When the amount of the liquid lowers to a predetermined amount as a result that the liquid 202 in the water-heating container 201 was discharged outside, the liquid 202 held in the water storage tank 220 is poured from a drain port 222 to the water-heating container 201 via a water supply passage 221 and is added by a constant amount. The liquid 202 to be added is poured intermittently or continuously until a predetermined amount. A water feed passage 224 is provided in a part or the inside of the water storage tank 220, whereby the liquid 202 fed by a water supply pump 223 is poured into the upper portion of a delivery port 220b facing a water supply port 226 via the water feed passage 224. The water supply port 226 is in a projection section 206a on the side of the main body 206 and provided below the upper end of the water-heating container 201. In addition, the water supply port 226 is positioned below a guide passage's highest point 211a which is the highest position of a guide passage 211, and below the steam port 205a. The water supply port 226 may be provided at any position not interfering with the opening and closing operation of the lid 205, whereby its position is not particularly limited.

The water supply pump 223 comprises an impeller 223a and a water supply motor 223b for driving it by magnetic coupling. The driving of the water supply pump 223 is controlled by a control section 204. The control section 204 drives the water supply pump 223 depending on the amount of liquid detected by a water level sensor 213 provided in the water-heating container 201 or the guide passage 211 until a predetermined water level is attained. The control section 204 may drive the water supply pump 223 for a constant time depending on the amount of water.

According to the embodiment, the amount of the liquid 202 required in the immediate future is heated and warmed in the water-heating container 201. Liquid to be heated for the future use is stored in the water storage tank 220 serving as a preparatory tank. Since the amount of liquid exceeding the amount required in the immediate future is not heated and warmed, power consumption is reduced. Since water is poured into the water storage tank 220 in which liquid not heated is stored, it is not necessary to exercise caution for hot water and steam. In addition, since the water supply port 226 is covered and concealed with the water storage tank 220 when the water storage tank 220 is installed, the water supply port 226 is not exposed outside, thereby not causing any problem in appearance.

Furthermore, in the case when the water supply pump 223 is operated continuously for some reason, water supply is carried but until the water level of the water-heating container 201 reaches the height of the water supply port 226. However, since the water supply port 226 is provided at the above-mentioned position, the liquid 202 is not supplied any more to the water-heating container 201 because of the head difference. In this case, since the water supply port 226 falls into an overflow state, the liquid 202 poured above the delivery port 220b is not supplied to the water-heating container 201 but returns downward to the water storage tank 220. Consequently, excessive water supply is prevented. Still further, even when continuous operation is carried out owing to abnormality in the water supply pump 223, outflow of the liquid 202 to the outside can be prevented.

[Embodiment 10]

An electric water heater in accordance with an embodiment 10 of the present invention will be described referring to FIG. 7.

As shown in FIG. 7, the water supply port 226 is positioned above the substantial full-level position 201*a* of the water-heating container 201. In addition, the drain port 222 and the water supply passage 221 are also configured so as to be positioned above the substantial full-level position 201*a* of the water-heating container 201.

With this configuration, water can be supplied smoothly to the water-heating container 201, and reverse flow from the water-heating container 201 to the water supply port 226 is prevented. Furthermore, since the water supply port 226 is positioned below the upper end of the water-heating container 201, an effect of preventing excessive water supply is obtained.

[Embodiment 11]

Figure 8:
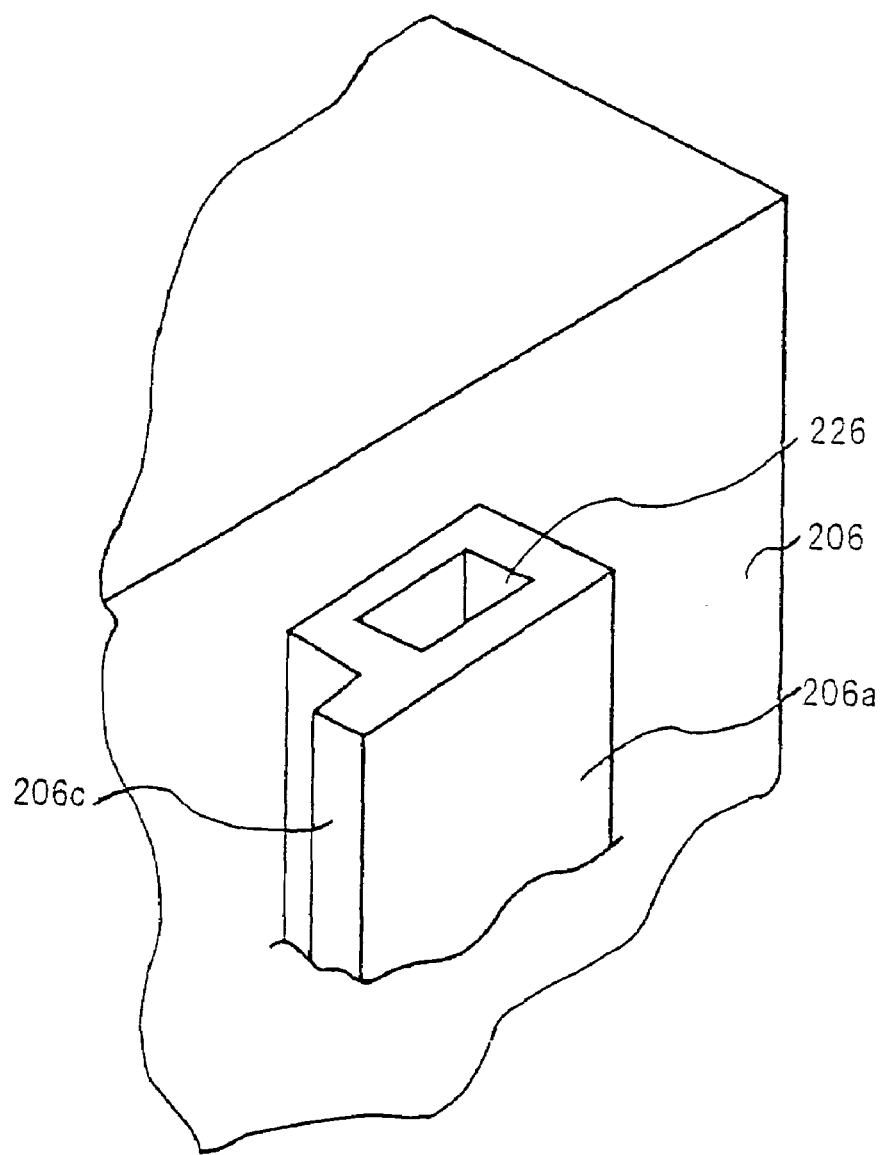
FIG. 8 is a perspective view showing the vicinity of the water supply port of an electric water heater in accordance with embodiment 17 of the present invention.

An electric water heater in accordance with an embodiment 11 of the present invention will be described referring to FIGS. 7 and 8.

In this embodiment, a projection section 206*a* is provided on the side of the main body 206, and the water supply port 226 is provided at the upper end of this projection section 206*a*. The projection section 206*a* may be provided at any position on the side of the main body 206. The projection section 206*a* is integrated with the main body 206, and the water storage tank 220 is formed so as to surround the projection section 206*a*.

With the configuration of this embodiment, in the case when the water supply pump 223 is operated continuously by some reason, water supply is carried out until the water level in the water-heating container 201 reaches the height of the water supply port 226. However, the liquid is not supplied any more to the water-heating container 201 because of the head difference but overflows from the water supply port 226 and returns downward to the water storage tank 220. Consequently, excessive water supply is prevented. Even when continuous operation is carried out owing to abnormality in the water supply pump 223, outflow of the liquid can be prevented.

[Embodiment 12]

An electric water heater in accordance with an embodiment 12 of the present invention will be described referring to FIG. 7.

In this embodiment, a packing 227, made of rubber or the like, for preventing water leakage is provided around the water supply port 226 as shown in FIG. 7. When the water storage tank 220 is installed in the main body 206, the water supply port 226 makes close contact with the delivery port 220*b* by the packing 227, whereby water leakage is prevented.

With the configuration of this embodiment, the close contact performance between the water supply port 226 and the delivery port 220*b* of the water storage tank 220 is improved, whereby water can be supplied securely to the water-heating container 201. In addition, it is possible to obtain an effect of preventing water leakage from the water supply port 226 during normal water supply and during excessive water supply. A similar effect can also be obtained by using another method wherein the water leakage performance around the water supply port 226 is improved by fitting between the main body 206 and the water storage tank 220.

[Embodiment 13]

An electric water heater in accordance with an embodiment 13 of the present invention will be described referring to FIG. 9. Since the basic configuration is similar to that of the above-mentioned embodiment 9, only the differences will be described.

Figure 9:
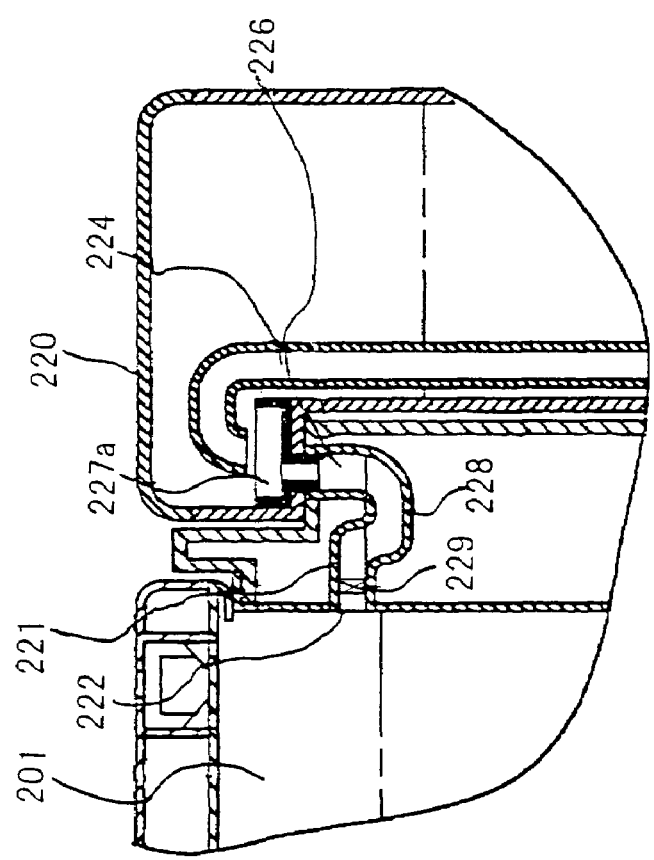
FIG. 9 is a cross-sectional view of a relevant part showing an electric water heater being common in embodiments 13, 18 and 19 of the present invention.

In this embodiment, as shown in FIG. 9, a large-size packing 227*a,* made of rubber or the like, for preventing water leakage is provided on the delivery port 220*b* serving as the connection section of the water-storage tank 220 and facing the water supply port 226 of the water-heating container 201. When the water storage tank 220 is installed in the main body 206, the packing 227*a* is connected to the water supply port 226.

With this configuration, the close contact performance between the water-heating container 201 and the water storage tank 220 is improved, whereby the liquid in the water storage tank 220 can be securely supplied to the water-heating container 201. Hence, it is possible to obtain an effect of preventing water leakage from the water supply port 226 during normal water supply and during excessive water supply.

[Embodiment 14]

An electric water heater in accordance with an embodiment 14 of the present invention will be described referring to FIG. 7 and FIG. 8.

In this embodiment, the water supply motor 223*b* of the water supply pump 223 is installed at a projection section 206*b* on the lower side of the main body 206. The impeller 223*a* facing the water supply motor 223*b* is provided in the lower portion of the water storage tank 220. The impeller 223*a* is rotated by magnetic coupling with the water supply motor 223*b*. By the rotation of the impeller 223*a,* the liquid 202 in the water storage tank 220 is lifted via the water feed passage 224 and poured into the water supply port 226.

With this configuration, water can be supplied smoothly to the water-heating container 201, and the amount, timing, etc. of water supply can be controlled by controlling the driving of the water supply motor 223*b*. In addition, since the projection section 206*b* on the side of the main body 206 is provided below the water storage tank 220 and the impeller 223*a* is disposed above it, the adjustment of axial alignment between the water supply motor 223*b* and the impeller 223*a* can be carried out by moving peripheral structure-components.

[Embodiment 15]

An electric water heater in accordance with an embodiment 15 of the present invention will be described referring to FIG. 7.

In this embodiment, the liquid 202 in the water storage tank 220 is fed through the water feed passage 224 and discharged from the end of the water feed passage 224 above the delivery port 220*b* by the operation of the water supply pump 223. The discharged liquid 202 is poured into the water-heating container 201 through the delivery port 220*b* and the water supply port 226. The highest portion (highest point) 224*a* of the water feed passage 224 is positioned above the water supply port 226 or the delivery port 220*b*.

With this configuration, it is possible to obtain an effect of preventing the liquid 202 in the water storage tank 220 from flowing to the water supply port 226 owing to the siphon phenomenon.

[Embodiment 16]

An electric water heater in accordance with an embodiment 16 of the present invention will be described referring to FIG. 7.

In this embodiment, the position of the water supply port 226 of the water-heating container 201 is upper than the full-level position 220a of the water storage tank 220.

With this embodiment, it is possible to prevent the liquid 202 in the water storage tank 220 from flowing to the water supply port 226 owing to the siphon phenomenon. In addition, in the case when a predetermined amount or more of the liquid 202 is supplied to the water-heating container 201, extra liquid can be returned smoothly to the water storage tank 220.

[Embodiment 17]

An electric water heater in accordance with an embodiment 17 of the present invention will be described referring to FIG. 8. Since the basic configuration of the electric water heater in accordance with this embodiment is similar to that of the above-mentioned embodiment 9, only the differences will be described.

On the projection section 206a provided on the side of the main body 206, an engagement section 206c with respect to the water storage tank 220 is provided in the vertical direction. The water storage tank 220 is regulated so that it can be attached and detached only by its vertical sliding movement by using this engagement section 206c.

When the water storage tank 220 is attached to the main body 206, the water storage tank 220 is guided by the engagement section 206c and securely attached to the main body 206. Hence, the close contact performance between the water supply port 226 and the delivery port 220b of the water storage tank 220 is improved, whereby an effect of preventing water leakage from the water supply port 226 can be obtained. Furthermore, the water storage tank 220 can be prevented from dropping inadvertently from the main body 206.

[Embodiment 18]

An electric water heater in accordance with an embodiment 18 of the present invention will be described referring to FIG. 9. Since the basic configuration of the electric water heater in accordance with this embodiment is similar to that of embodiment 9, only the differences will be described.

In this embodiment, the water supply port 226 of the water-heating container 201 is connected to the water-heating container 201 via the water supply passage 221 and the drain port 222. A low passage 228 positioned below the lower end of the drain port 222 is provided at a part of the water supply passage 221.

With this configuration, the supplied liquid 202 stays in the low passage 228 of the water supply passage 221, whereby the water supply passage 221 is closed by the liquid 202. Since the low passage 228 is provided, steam generated when the liquid in the water-heating container 201 is boiled can be prevented from blowing out from the water supply port 226.

[Embodiment 19]

An electric water heater in accordance with an embodiment 19 of the present invention will be described referring to FIG. 9. Since the basic configuration of the electric water heater in accordance with embodiment 19 is similar to that of the above-mentioned embodiment 9, only the differences will be described.

In this embodiment, a stop valve 229 for preventing liquid from flowing out when the electric water heater is turned over is provided in the water supply passage 221 from which liquid is supplied from the water storage tank 220 to the water-heating container 201.

With this embodiment, the liquid in the water-heating container 201 can be prevented from flowing outside when the main body 206 is turned over.

As mentioned above, although the respective embodiments 9 to 19 have been described independently, two or more of the respective embodiments can be combined and used appropriately, and the present invention is not limited to the respective embodiments.

According to the electric water heater of the above-mentioned embodiments 9 to embodiment 19 of the present invention, only the amount of liquid required in the immediate future is heated and warmed in the water-heating container, and the other amount of liquid is stored in the water storage tank, whereby power consumption can be reduced. Since water is supplied to the water storage tank at the time of water replenishment, it is not necessary to touch the water-heating container, whereby it is not necessary to exercise caution for hot water having a high temperature and steam. In addition, when an excessive amount of water is supplied to the water-heating container 201 because of abnormality or the like in the pump, extra water returns to the water storage tank without spilling outside, whereby excessive water supply can be prevented.

[Embodiment 20]

Figure 10:
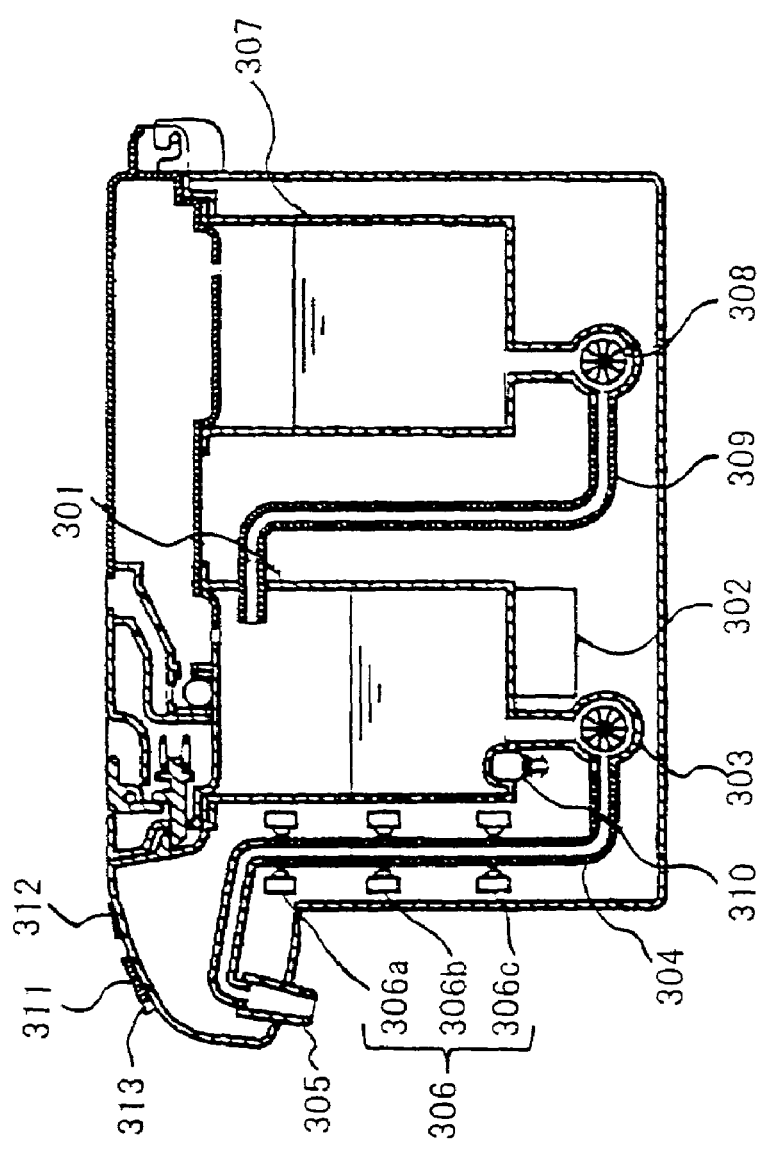
FIG. 10 is a cross-sectional view showing an electric water heater being common in embodiments 20 to 23 of the present invention.

FIG. 10 is a cross-sectional view showing an electric water heater in accordance with an embodiment 20 of the present invention.

In the figure, a water-heating container 301 wherein water is heated and warmed is provided with a heating section 302 comprising a main heater of 925 W and a warming heater of 75 W for heating the water-heating container 301. A water discharge section 303 is a pump for discharging the hot water in the water-heating container 301 from a hot water discharge port 305 through a water pipe 304. The water pipe 304 is provided with a water amount detection section 306 comprising a plurality of detection sections 306a, 306b and 306c for detecting the amount of water in the water-heating container 301. The detection sections 306a to 306c comprise a plurality of infrared emitting devices and receiving devices installed so as to face the water pipe 304. Since the level of liquid in the water-heating container 301 becomes identical to that in the water pipe 304, the level of water in the water-heating container 301 can be detected by detecting the level of the liquid surface in the water pipe 304. The detection section 306a is a full level detection section provided at the full level position and hereafter referred to as a full level detection section 306a. The detection section 306c is a detection section provided at a water level position wherein heating by the heating section 302 is stopped to prevent dry-boiling of the water-heating container 301 and hereafter referred to as a water supply detection section 306c. The detection section 306b is a detection section provided at an intermediate position between the full level detection section 306a and the water supply detection section 306c and hereafter referred to as an intermediate detection section 306b. Three water levels can be detected by the full level detection section 306a, the intermediate detection section 306b and the water supply detection section 306c.

In a water supply container 307 having water for supplying water to the water-heating container 301, the water in the water supply container 307 is supplied to the water-heating container 301 via a water supply pipe 309 having a water supply section 308 comprising a pump. A temperature detection section 310 detects the temperature of the hot water in the water-heating container 301. A hot water discharge switch 311 is a switch that is operated by the user to give an instruction for discharging hot water. A lock release switch 312 is a lock release switch for giving permission for the acceptance of the hot water discharge switch 311.

The operation of the electric water heater in accordance with this embodiment configured above will be described. When the water level in the water-heating container 301 is lower than the position of the water supply detection section 306c, the heating of the heating section 302 is stopped to prevent dry-boiling. When the water level in the water-heating container 301 is lower than the position of the full level detection section 306a, the water supply section 308 automatically starts water supply and stops water supply when the water level reaches the position of the full level detection section 306a or more. When the water level exceeds the position of the water supply detection section 306c, the heating section 302 starts heating, and heating by the main heater is carried out until boiling is detected by the temperature detection section 310. After the boiling is detected, warming by the warming heater is carried out.

When the water discharge section 303 is operated, hot water passes through the water pipe 304 and the water discharge port 305, whereby the water amount detection section 306 erroneously detects that the water level is at the position of the full level detection section 306a. To prevent this erroneous detection, the water amount detection section is configured so as not to detect the amount of hot water in the water-heating container 301 during hot water discharge. Although the amount of hot water in the water-heating container 301 decreases by repeating discharge of the hot water during warming, when the level of the hot water is at the position of the intermediate detection section 306b or higher, water supply by the water supply section 308 is not carried out. When it is detected that the level of the hot water is lower than the position of the intermediate detection section 306b, the water supply section 308 starts water supply operation after a lapse of five minutes from the time of the detection. When the full level detection section 306a detects the full level, the water supply section 308 stops.

When water is supplied to the water-heating container 301, the temperature of the hot water lowers. When the temperature detection section 310 detects a temperature drop of about 3° C. or more, the heating section 302 starts heating. A situation wherein the user discharges hot water during warming is assumed herein. First, it is assumed that hot water is poured into a cup of noodles, for example, when hot water is warmed while the level of the hot water is at the position of the intermediate detection section 306b or higher. Although the amount of the hot water decreases when poured, it is assumed that the level of the hot water is still at the position of the intermediate detection section 306b or higher. Next, it is assumed that the hot water is poured into a second cup of noodles. At this time, it is assumed that the hot water decreases to a level lower than the intermediate detection section 306b. Then, the water amount detection section 306 detects that the water level is lower than the position of intermediate detection section 306b, and water supply is started immediately. Hence, the temperature of the hot water in the water-heating container 301 lowers.

If the hot water is poured into a third cup of noodles, since water supply has already been started from the water supply container 307, hot water having a lower temperature is discharged, whereby the third cup of noodles cannot be cooked properly. In order to pour hot water having a high temperature into the third cup of noodles, the user is kept waiting several minutes until the hot water is boiled. In consideration of this kind of usage situation, even when the hot water is decreased lower than the water level of the intermediate detection section 306b which is a-reference point for the start of water supply, water supply is not carried out in a predetermined time period (hereafter, referred to as a prohibition time) in this embodiment. With this configuration, in the case that hot water is discharged intermittently in a short time period, even when it is detected that the water level is lowered by the last hot water discharge to the water level at which water supply should be started, water supply is not started immediately. Hence, the temperature of the hot water in the water-heating container does not lower. Therefore, if the next hot water discharge is carried out within the prohibition time, hot water having a temperature equivalent to that of the hot water discharged the last time is discharged. When the above-mentioned prohibition time elapses, water supply is started automatically to the full level and heating is carried out. Hence, even if the user does not pay attention to water supply, water is supplied to the full level automatically, heated and warmed.

The prohibition time in which water supply is prohibited is made changeable by the user as desired. Since the prohibition time can be changed, each user can set the prohibition time according to the amount of hot water to be discharged at one time and the number of hot water discharge times. For example, in the case of the user who uses hot water to make only one cup of coffee, it is not necessary to extend the prohibition time. In the case of the user who has a large family and cooks a plurality of large cups of noodles, it is necessary to extend the prohibition time.

In this embodiment, a special-purpose up/down switch (not shown) is provided in the vicinity of the hot water discharge switch 311, and the prohibition time in the range of one minute to 10 minutes can be set at intervals of one minute. In addition, the prohibition time in the range of 10 minutes to 30 minutes can be set at intervals of five minutes. As mentioned above, the prohibition time is changed according to the amount of hot water to be used, which differs depending on the usage situation of each user, whereby an inconvenience in which the temperature of hot water lowers owing to water supply during usage can be resolved.

[Embodiment 21]

Next, an electric water heater in accordance with an embodiment 21 of the present invention will be described.

The electric water heater in accordance with this embodiment is characterized in that in the case when the user operates the lock release switch 312 or the hot water discharge switch 311 within the water supply prohibition time in the embodiment 20, the water supply prohibition time is extended further by a predetermined time period from the time when the operation is done.

The operation will be described below according to the flowchart shown in FIG. 11. First, warming starts at step S1. At step S2, a judgment is made as to whether the amount of hot water in the water-heating container 301 is lower than the water level of the intermediate detection section 306b or not. In the case when the amount of hot water is at the water level of the intermediate detection section 306b or higher, the sequence returns to step S1, and warming continues. When it is judged at step S2 that the amount of hot water is lower than the water level of the intermediate detection section 306b, a water supply prohibition timer is started at step S3. At step S4, a time judgment is done; if a predetermined time period has not elapsed, a judgment is made at step 5 as to whether the lock release switch 312 and the hot water discharge switch 311 are pressed or not. In the case when not pressed, a wait is given at step S4 until the predetermined time period elapses. When it is judged at step S5 that the lock release switch 312 and the hot water discharge switch 311 are pressed, the sequence advances to step S6, the water supply prohibition timer is reset, and the water supply prohibition timer is started again at step S3. If the predetermined time period has elapsed at step S4, the water supply prohibition timer is reset at step S7, and water supply starts at step S8.

According to this embodiment, even if the water level becomes lower than the position of the intermediate detection section 306b which is the reference water level at which water supply is started, water supply is prohibited for the predetermined time period. Hence, in the case when hot water discharge is performed a plurality of times at short time intervals, even when it is detected that the water level becomes at the water level at which water supply should be started or lower owing to the last hot water discharge, water supply is not carried out immediately. Hence, the temperature of the hot water in the water-heating container 301 does not lower. If the next hot water discharge is done within the predetermined time period, hot water having the same temperature as that obtained at the time of the last hot water discharge is discharged. In addition, when the lock release switch 312 and the hot water discharge switch 311 are operated within the predetermined time period, the timekeeping of the predetermined time period is restarted from the time of the operation, and water supply is prohibited during the time. Hence, even if hot water discharge is repeated intermittently any number of times, a problem wherein water supply is carried out immediately before hot water discharge and heating is started does not occur.

[Embodiment 22]

Next, an electric water heater in accordance with an embodiment 22 of the present invention will be described below.

Figure 11:
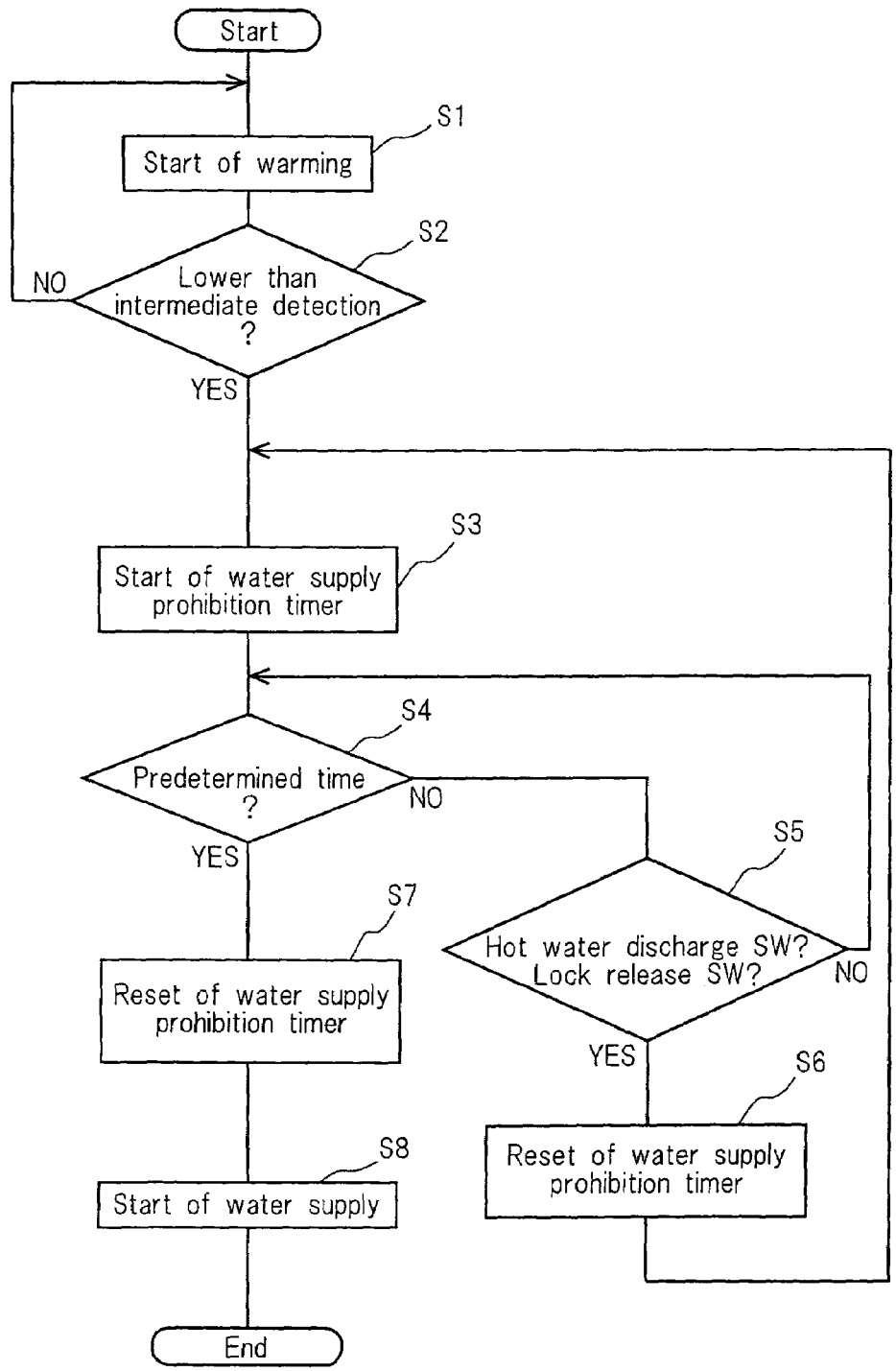
FIG. 11 is a flowchart showing the operation of the electric water heater in accordance with embodiment 21 of the present invention.
Figure 12:
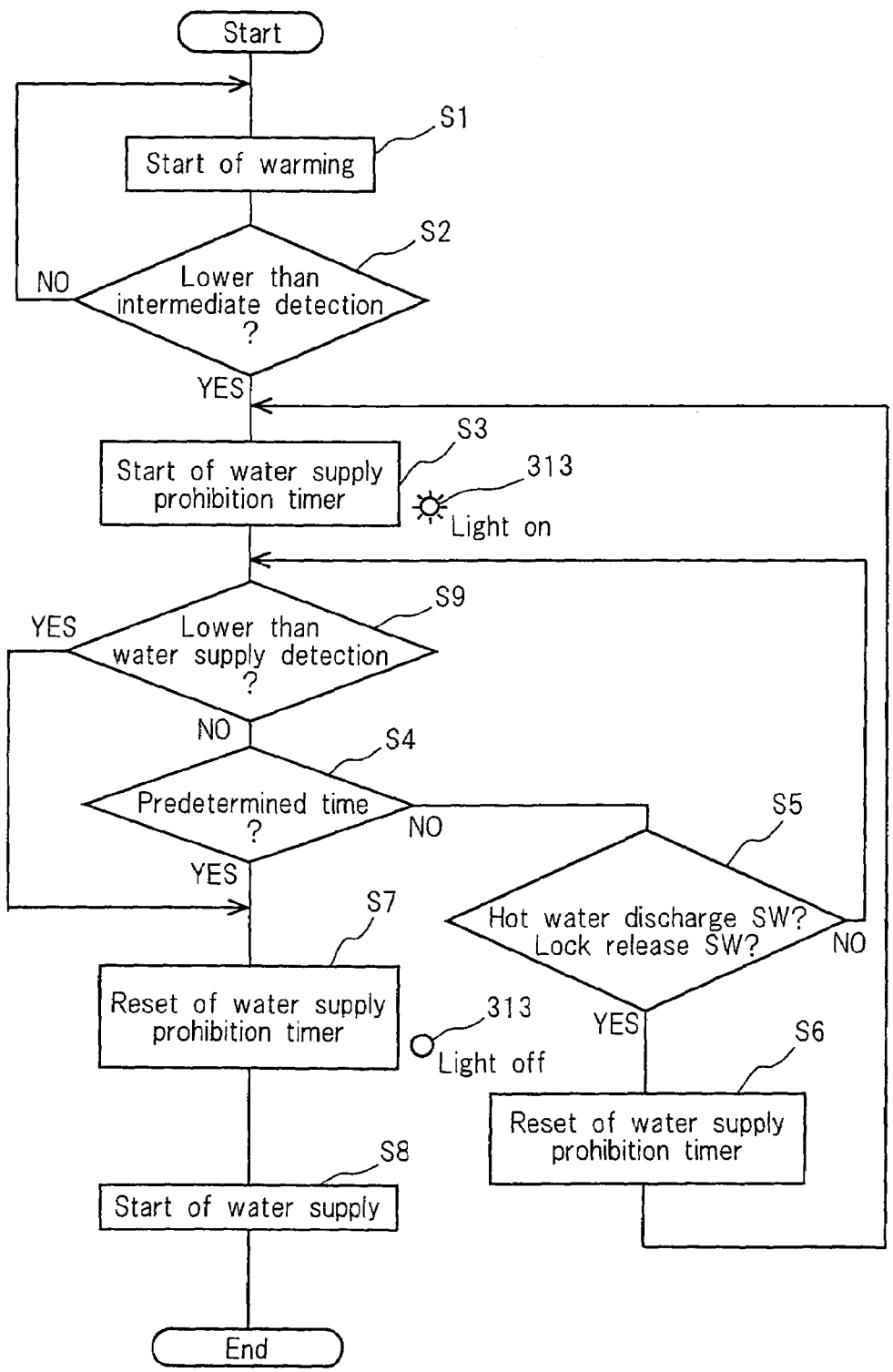
FIG. 12 is a flowchart showing the operation of the electric water heater being common in embodiments 22 and 23 of the present invention.

This embodiment is characterized in that step S9 is added to the flowchart shown in FIG. 11, as shown in FIG. 12. If the water level of the water-heating container 301 is at the water level of the water supply detection section 306c or higher (not lower than the water supply detection) at step S9, the sequence advances to step S4, and a judgment is made as to the elapse of the predetermined time period. If it is judged at step S9 that the water level is lower than the water level of the water supply detection section 306c, the sequence immediately advances to step S7 without waiting for the elapse of the predetermined time period at step S4, and the water supply prohibition timer is reset, and water supply is started at step S8.

In this embodiment, in the case when the water amount detection section 306 detects that the amount of hot water in the water-heating container 301 is less than the amount of hot water at which heating by the heating section 302 is stopped, the extension of the predetermined time period is stopped, and the water supply section 308 is operated to supply water. In other words, when it is detected that water replenishment to the water-heating container 301 is necessary, water supply is started immediately even during the extension of the predetermined time period. Hence, water supply and heating can be carried out immediately without waiting for the elapse of the predetermined time period in the state having no remaining amount of hot water.

[Embodiment 23]

Next, an electric water heater in accordance with an embodiment 23 of the present invention will be described below.

The electric water heater in accordance with this embodiment is provided with a water supply advance notice display section 313 formed of an LED or the like in the vicinity of the hot water discharge switch 311 on the upper face as shown in FIG. 10. The LED serving as the water supply advance notice display section 313 is turned on simultaneously with the start of the water supply prohibition timer at step S3 in FIG. 11, and the LED is turned off simultaneously with the reset of the water supply prohibition timer at step S7.

Since the LED lights for the predetermined time period in which water supply is prohibited, the user can confirm that water supply is being prohibited and can visually recognize the timing of the start of water supply. Hence, it is not necessary to exercise caution for the sudden start of automatic water supply. In addition, hot water can be used up before the temperature of the hot water lowers, or water replenishment to the water supply container 307 is carried out so as to be prepared for automatic water supply for example, preliminary preparations can be done easily, and usability is improved.

In the electric water heaters in accordance with the above-mentioned embodiments 20 to 23 of the present invention, even if the remaining amount of hot water is lower than the reference amount of hot water for the start of water supply, water supply is prohibited for the predetermined time period. Hence, the temperature drop of the hot water in the water-heating container can be prevented, and if the next hot water discharge is carried out within the predetermined time period, hot water having a temperature equivalent to that of the hot water discharged the last time can be obtained.

[Embodiment 24]

Figure 13:
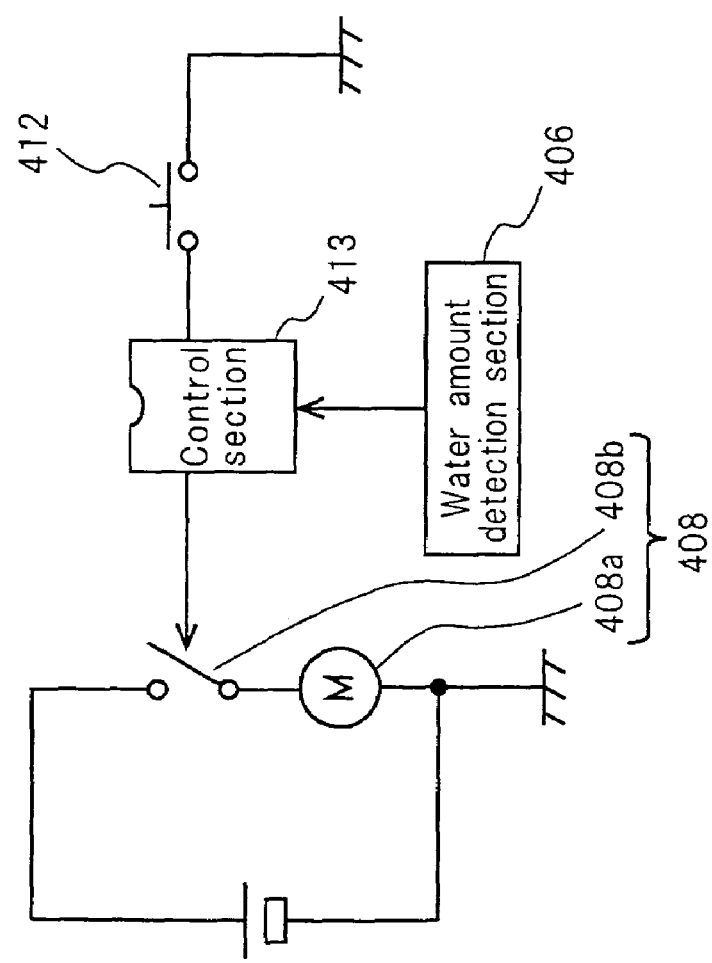
FIG. 13 is a circuit diagram of the water supply control section of an electric water heater in accordance with embodiment 24 of the present invention.
Figure 14:
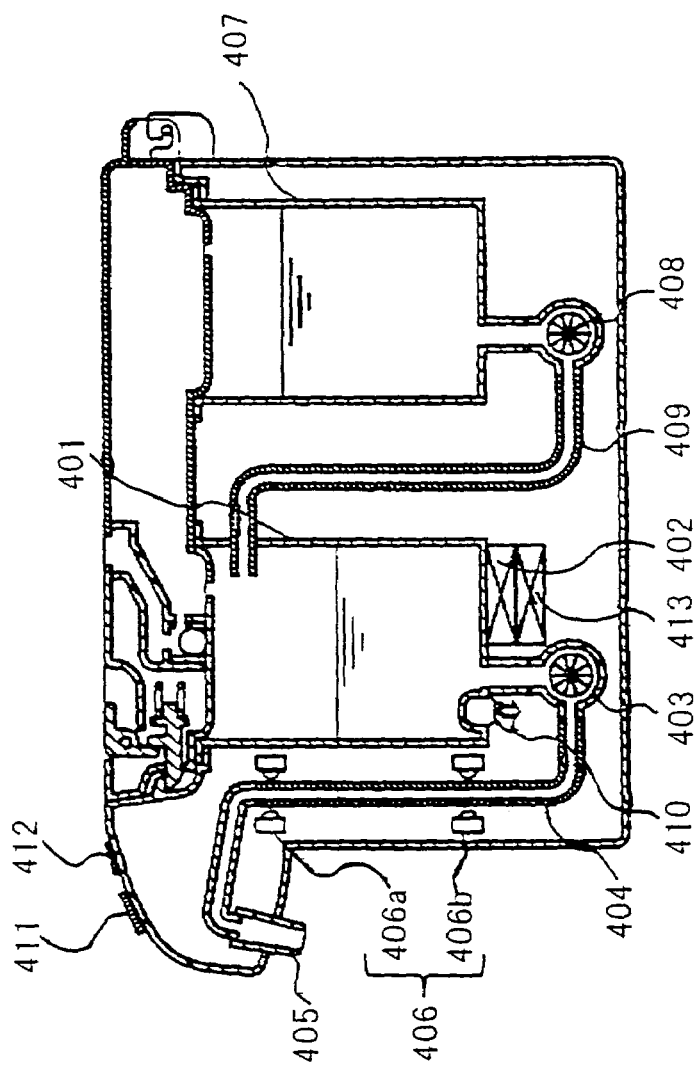
FIG. 14 is a cross-sectional view showing an electric water heater in accordance with embodiment 24 of the present invention.

FIG. 13 is a circuit diagram of a control circuit for carrying out water supply control for an electric water heater in accordance with an embodiment 24 of the present invention, and FIG. 14 is a cross-sectional view showing the electric water heater.

In FIG. 13 and FIG. 14, a heating section 402 comprising a main heater for heating a water-heating container 401 and a warming heater for warming it is provided at the lower part of the water-heating container 401 in which water is heated and warmed. A hot water discharge section 403 is a pump for discharging the hot water of the water-heating container 401 from a discharge port 405 via a water pipe 404. A water amount detection section 406 comprises water level detectors 406a and 406b, each being a set of infrared emitting devices and receiving devices installed facing each other across the water pipe 404. The water level detectors 406a and 406b detect the water level in the water-heating container 401 by detecting the water level in the water pipe 404, which is identical to that in the water-heating container 401. The water level detector 406a is used for full level detection which is installed at the full level position, and the water level detector 406b is used for water supply detection which is installed at the water level position wherein the heating section is stopped to prevent dry-boiling of the water-heating container 401. A water supply container 407 holds water to be supplied to the water-heating container 401. A water supply section 408 supplies the water in the water supply container 407 to the water-heating container 401 via a water pipe 409. The water supply section 8(sic) comprises a water supply motor 408a and a switch 408b for turning on/off the electric power of the water supply motor 408a.

A temperature detection section 410 detects the temperature of the hot water in the water-heating container 401. A hot water discharge switch 411 is a switch that is operated by the user to give an instruction for discharging hot water and also functions as a lock release switch for releasing the locking of the hot water discharge switch 411. In the vicinity of the hot water discharge switch 411, a water supply switch 412 which is a feature in the present embodiment is provided, and the amount of water in the water-heating container 401 can be adjusted as desired by operating this water supply switch 412. A control section 413 controls the heating section 402 and the water supply section 408 and the like.

FIG. 13 is the circuit diagram of the control circuit for carrying out automatic water supply control for supplying water from the water supply container 407 to the water-heating container 401 of the electric water heater in accordance with this embodiment. The water supply section 408 having the water supply motor 408a for driving a water supply pump is controlled by the control section 413 having a microcomputer. In automatic water supply control in an ordinary operation, the control section 413 turns on/off the switch 408b of the water supply motor 408a of the water supply section 408 on the basis of a signal from the water amount detection section 406 and controls water supply.

When the water supply switch 412 is operated and turned on while water supply is carried out by automatic water supply control, the automatic water supply control becomes invalid, and manual water supply control is carried out. In other words, when the water supply switch 412 is turned on, the switch 408b is turned off, and the water supply motor 408a is stopped and water supply is interrupted. When the water supply switch 412 is operated again, the automatic water supply control is resumed. In this way, each time the water supply switch 412 is operated, the automatic water supply control is stopped and started alternately.

The manual water supply control in accordance with this embodiment means to interrupt or start the automatic water supply control by manual operation when a desired water level is attained during the automatic water supply control.

The operation of the electric water heater in accordance with this embodiment will be described below.

First, description is made as to the case wherein water is supplied to the water-heating container 401 in an empty state by the automatic water supply control. When electric power is supplied to the electric water heater, the control section 413 receives a signal indicating that the amount of water detected by the water amount detection section 406 is the water level detector 406b or below and turns on the switch 408b of the water supply section 408 to operate the water supply motor 408a and start water supply.

When the water level becomes the position of the water level detector 406b which is the dry-boiling prevention level or higher, the heating section 402 is turned on, and heating is started. When water supply is continued further and the water level rises and reaches the position of the full level detector 406a, the switch 408b of the water supply section 408 is turned off, the water supply motor 408a is stopped, and water supply is stopped. The water supplied to the water-heating container 401 is heated by only the main heater or by both the main and warming heaters until the temperature detection section 410 detects boiling. After the boiling is detected, warming is carried out by the warming heater. After this state, the hot water in the water-heating container 401 is discharged and used appropriately, and the water level lowers. When the water level becomes lower than the position of the water level detector 406b, automatic water supply starts after the hot water discharge. The electric water heater is used so that automatic water supply and hot water discharge are repeated as described above.

As the basic configuration of this embodiment, in both cases of the automatic water supply control and the manual water supply control, when the water level of the water-heating container 401 is lower than the position of the water level detector 406b, the heating of the heating section 402 is stopped. Hence, dry-boiling is prevented and safety is ensured.

In the case that a desired amount of hot water is boiled quickly, the automatic water supply control is switched to the manual water supply control. When the user has visually confirmed that the desired water level is attained by the water pipe 404 during water supply in the automatic water supply control, an operation such as the pressing of the water supply switch 412 is carried out. Then the water supply section 408 stops and water supply stops. Since the heating section 402 is in ON state at this time, the desired amount of water in the water-heating container 401 can be heated and boiled. After hot water is used up, the automatic water supply control is resumed by operating the water supply switch 412, and water supply is started. As mentioned above, since only the necessary amount of hot water can be obtained, the time required for boiling can be minimized.

The effect of this embodiment will be described below in detail. It is assumed that the storage capacity of the water-heating container 401 amounts to five cups of noodles. Description is made as to a case wherein after hot water has poured into five cups of noodles, hot water is poured into a sixth cup of noodles. In the automatic water supply control, when hot water is poured into the five cups of noodles and used up, water supply is started from the water supply container 407 to the water-heating container 401 by the automatic water supply control. When the amount of water reaches the water level equivalent to one cup of noodles during water supply, the user operates the water supply switch 412 to interrupt the automatic water supply control and stop water supply. Then, when the amount of hot water equivalent to one cup of noodles is boiled, the hot water is poured into one cup of noodles. Since the user operates the water supply switch 412 as described above to boil the amount of hot water equivalent to one cup of noodles which is required in the immediate future, boiling can be carried out in a short time. Since it is not necessary to boil extra water equivalent to four cups of noodles, a waiting time can be minimized, whereby it is possible to shorten the time difference among the eating start times of all six people who eat cups of noodles.

Description is made as to a case wherein the water-heating container 401 was emptied and the power source was turned off in the last evening, and the user wishes to have one cup of coffee in the next morning. When the power source of the electric water heater is turned on, the water-heating container 401 is usually filled with water by the automatic water supply control and heating starts. Hence, a considerable time is required until boiling. However, in this embodiment, when the water supply switch 412 is operated after judging that the amount of hot water equivalent to one cup has been supplied, water supply is interrupted. Since the amount of water equivalent to one cup can be boiled in a short time, it is possible to drink coffee earlier.

As mentioned above, in this embodiment, troublesome water supply is carried out automatically in an ordinary usage state, and if necessary, a desired amount of water may be supplied manually and then heated. Hence, a convenient electric water heater can be attained. Since the amount of water required in the immediate future should only be supplied, heated and warmed, it is not necessary to use extra electric power to heat and warm extra water not required in the immediate future. Since the stop and start of automatic water supply control can be carried out by simple operation of pressing the water supply switch 412, such as a pushbutton switch, it is possible to provide an electric water heater having excellent operability.

This embodiment is configured so that the automatic water supply control by the water supply section 408 is stopped when the water supply switch 412 is operated, that is, when manual water supply control is carried out; however, when the amount of water detected by the water amount detection section 406 is the amount of water at which the heating section is required to be stopped, that is, lower than the water level of the water level detector 406b, the embodiment may be configured so that the automatic water supply control of the water supply section cannot be stopped even if the water supply switch 412 is operated. This can eliminate a problem wherein the whole operation of the water heater is stopped if water supply is stopped when the amount of water is an amount at which heating is stopped.

While the automatic water supply control of the water supply section is stopped by the operation of the water supply switch 412, if the amount of water detected by the water amount detection section 406 becomes lower than the amount of water at which the heating section is required to be stopped, that is, the water level of the water level detector 406b, the stop of the automatic water supply control should be cancelled automatically so that the automatic water supply control is carried out. This can eliminate the problem wherein the whole operation of the water heater is stopped if water supply is stopped when the amount of water is an amount at which heating is stopped.

Next, description is made as to occasions at which the automatic water supply control of the water supply section 408 cannot be stopped or started by the water supply switch 412. When the water level of the water-heating container 401 is in its dry-boiling prevention region or at its full level, the manual water supply control is not operated for safety. In other words, the automatic water supply control cannot be stopped. In these cases, a notice should be given to inform that even if the water supply switch 412 is operated, the operation is not accepted. Hence, the user can know the state of the water-heating container 401, whereby operability and safety can be improved.

[Embodiment 25]

Figure 15:
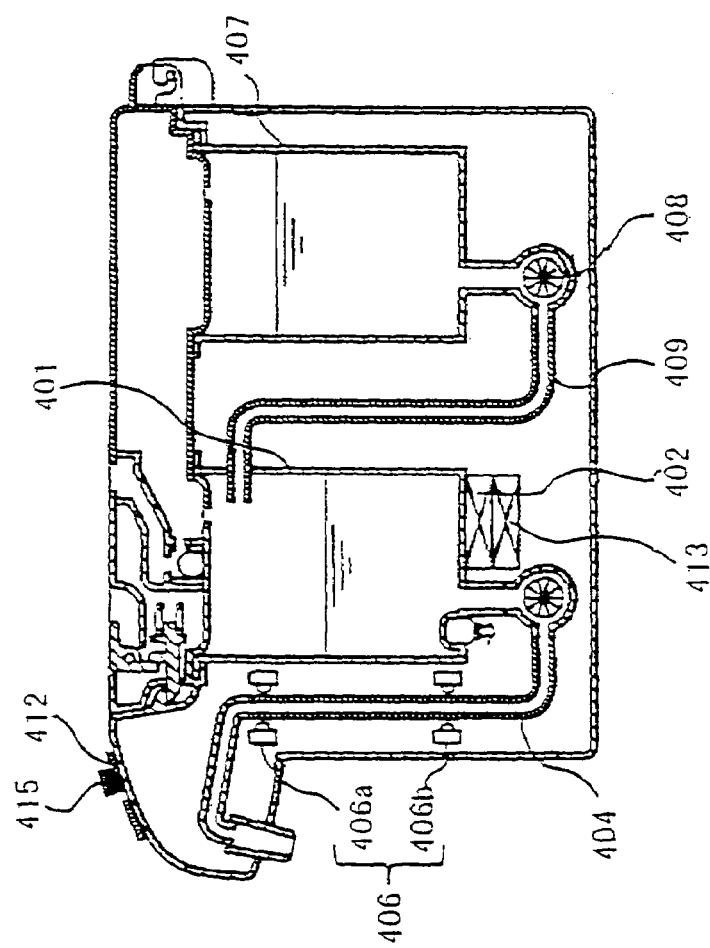
FIG. 15 is a cross-sectional view showing an electric water heater in accordance with embodiment 25 of the present invention.
Figure 16:
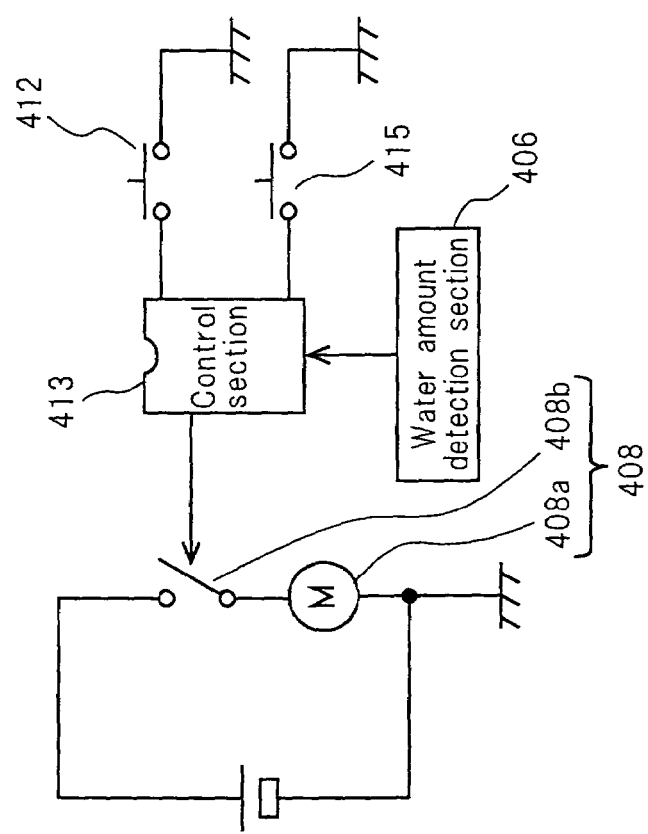
FIG. 16 is a circuit diagram of the water supply control section of the electric water heater in accordance with embodiment 25 of the present invention.

FIG. 15 is a cross-sectional view showing an electric water heater in accordance with an embodiment 25 of the present invention, and FIG. 16 is a circuit diagram of a control circuit for carrying out water supply control for the electric water heater. Since the basic configuration of this embodiment is the same as that of the above-mentioned embodiment 24, only the differences will be described below. The components having the same functions as those shown in FIG. 14 are designated by the same reference numerals and their explanations are omitted.

The present embodiment differs from the embodiment 24 in that a selection switch 415 is provided as a switching section for switching between the automatic water supply control and the manual water supply control. As shown in FIG. 15, the selection switch 415 in accordance with this embodiment is provided in the vicinity of the water supply switch 412. In FIG. 16., when the selection switch 415 is turned on, the automatic water supply control is selected, and the automatic water supply control is carried out in a manner similar to the case in the descriptions of Embodiment 24.

When the selection switch 415 is turned off, the manual water supply control is selected. In the state that the manual water supply control is selected, water supply is not yet carried out. When the water supply switch 412 is operated next, water supply is started. At a time point when a desired amount of water is supplied to the water-heating container 401, the water supply switch 412 is operated to stop water supply. The water supply switch 412 may be a push type, for example, so that water supply is carried out only while the switch is pressed. The push type is not so desirable in operability since it must be kept pressed for a long time when the amount of water to be supplied is large. After hot water obtained by heating the required amount of water supplied as described above is used, when the selection switch 415 is turned on, the automatic water supply control is selected and water supply is started.

The water supply switch 412 and the selection switch 415 may be integrated into one switch. For example, a push-rotary switch may be used. The push-rotary switch has a locked knob, and when this knob is pressed, the lock is released and the knob pops out. With this operation, the automatic water supply control is switched to the manual water supply control. In addition, when the knob popped out is turned, water supply is started. When the knob is turned to its original position after the water level has reached a desired amount, water supply is stopped. When the knob is pressed after hot water obtained by heating this water is used, the knob is locked again and the manual water supply control is switched to the automatic water supply control.

In the present embodiment, the user clearly recognizes which of the automatic water supply control and the manual water supply control is selected. Furthermore, since it is not required to continue the operation of the water supply switch 412 during water supply, operability is improved.

Figure 17:
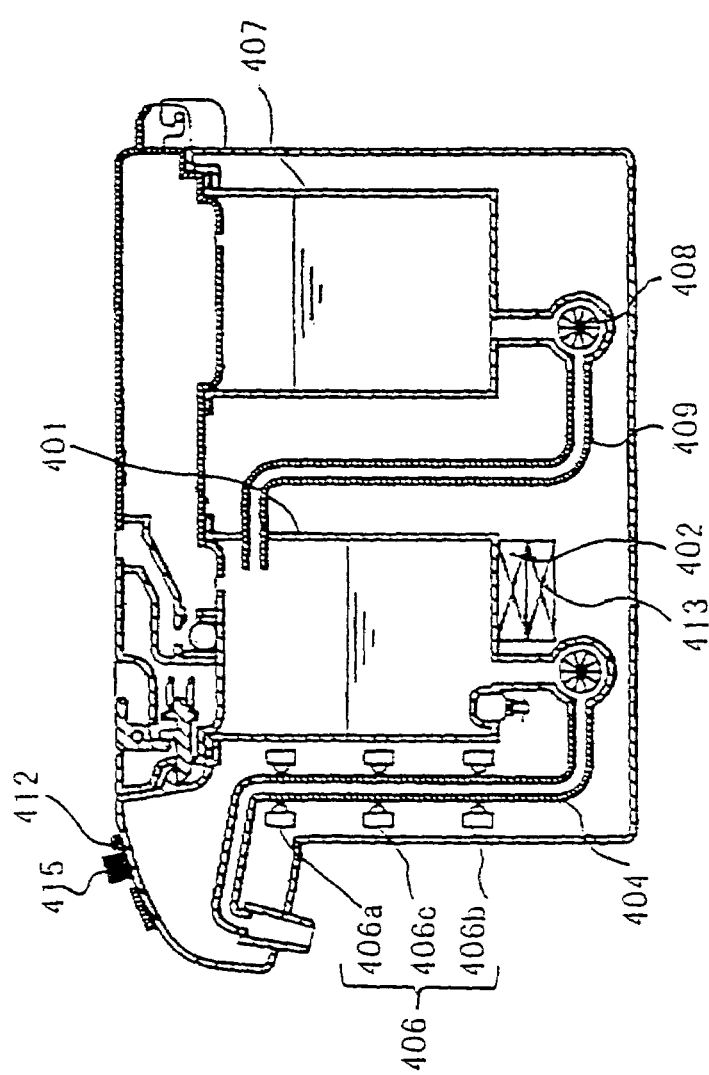
FIG. 17 is a cross-sectional view showing another example of the electric water heater in accordance with embodiment 25 of the present invention.
Figure 18:
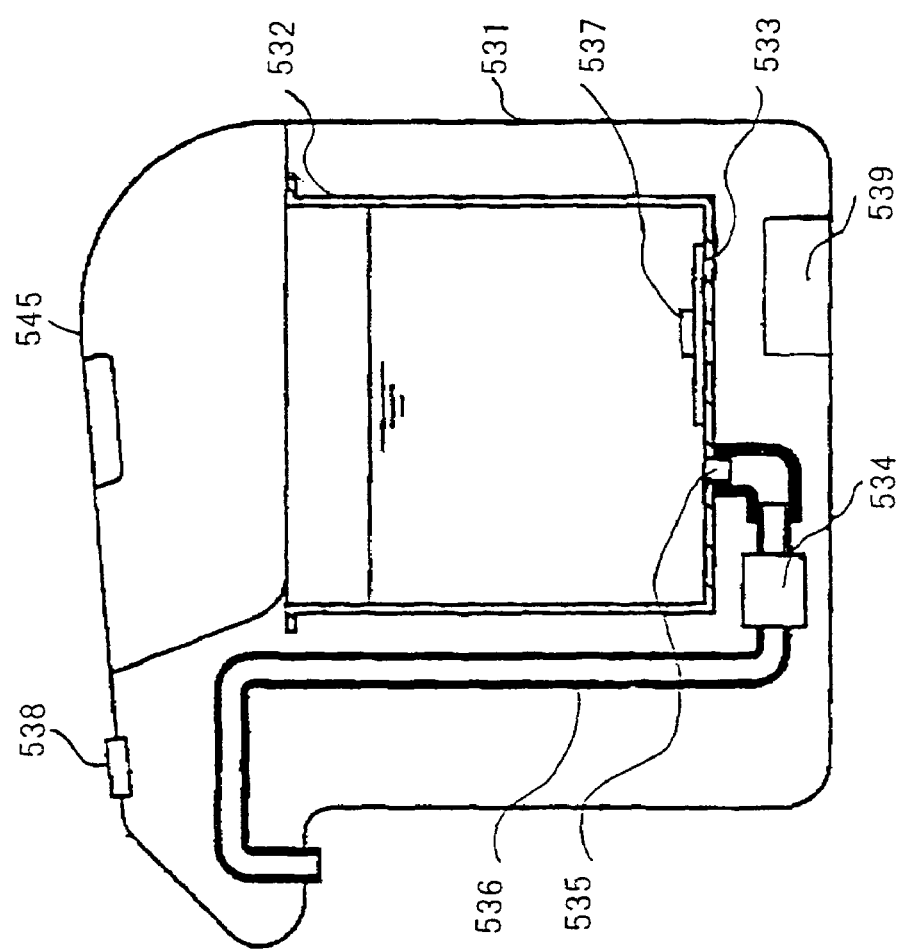
FIG. 18 is the cross-sectional view showing the conventional electric water heater.

FIG. 17 is a cross-sectional view showing another example of the electric water heater in accordance with the embodiment 25 of the present invention. This differs from the electric water heater shown in FIG. 15 in that an intermediate detector 406c is newly provided between the full level detector 406a and the water supply detector 406b in the water amount detection section 406. When the water level in the water-heating container 401 reaches the position of the intermediate detector 406c or lower, water supply is started automatically. According to the embodiment, although hot water at the water level of the intermediate detector 406c or higher is warmed at all times, conversely, a desired amount of hot water at the water level of the intermediate detector 406c or lower cannot be boiled. However, in the present embodiment, when the water supply switch 412 is operated after the manual water supply control is selected by turning off the selection switch 415, water supply can be carried out to the water level of the intermediate detector 406c or lower. In other words, even in the case that the intermediate detector 406c is provided, any amount of hot water can be heated for convenience.

Incidentally, in the above-mentioned embodiments 24 and 25, it is desired that a display section, such as an LED, should be used for display to easily distinguish whether the current water supply state is the automatic water supply control or the manual water supply control.

According to the electric water heaters in accordance with the above-mentioned embodiments 24 and 25 of the present invention, a waiting time can be minimized by supplying only the amount of water required in the immediate future to the water supply container and by heating the water.

INDUSTRIAL APPLICABILITY

According to the present invention, a water storage container separate from the water-heating container is provided so as to be attached to and detached from the water-heating container. Hence, it is possible to provide a water heater wherein the amount of water to be heated and-warmed at one time in the water-heating container is reduced, power consumption during warming is lowered and water supply is carried out conveniently.

In addition, the driving control of the water supply section for supplying the liquid of the water storage tank to the water-heating tank can be restricted to a minimum necessary amount. Hence, it is possible to eliminate noise of the water supply section at the time when a judgment is made as to whether water supply to the water storage tank is necessary or not, and the durability of the water supply section can be improved.

Furthermore, only the amount of liquid required in the immediate future is heated and warmed in the water-heating container, and the other amount of liquid is stored in the water storage tank, whereby power consumption can be reduced. At the time of water replenishment, water is supplied to the water storage tank, whereby it is not necessary to touch the water-heating tank and it is not necessary to exercise caution for hot water having a high temperature and steam. Still further, in the case when an excessive amount of water is supplied to the water-heating container 201 owing to abnormality or the like in the pump, extra water returns to the water storage tank without spilling outside, whereby excessive water supply can be prevented.

Even when the remaining amount of hot water is lower than the reference amount of hot water at which water supply is started, water supply is prohibited in a predetermined time period. This prevents the temperature of the hot water in the water-heating container from lowering, whereby hot water having a temperature equivalent to that of the hot water discharged the last time is obtained if the next hot water discharge is done within the predetermined time period. In addition, a waiting time can be minimized by supplying only the amount of water required in the immediate future to the water supply container and by heating the water.

What is claimed is:

1. An electric water heater comprising a main body provided with a water-heating container, a water storage container for storing liquid to be supplied to said water-heating container, a heating device for heating the liquid in said water-heating container, a hot water discharge passage for discharging the liquid in said water-heating container, a hot water discharge section provided in said hot water discharge passage, a supply passage for supplying the liquid of said water storage container to said water-heating container, and a water conveyance device provided in said supply passage, wherein
a delivery port provided on said water storage container and a water supply port provided on said main body which serve as a connection section for disconnecting or connecting said supply passage, are provided in the middle of said supply passage, said water storage container is made possible to attach to and detach from said main body by the disconnection or connection at said connection section, and said water supply port is provided below the upper end of said water-heating container so that when the liquid in said water storage tank which is lifted and poured above said delivery port becomes an overflow state at said water supply port, the liquid returns downward to said water storage tank.

2. An electric water heater in accordance with claim 1, wherein a check valve for allowing liquid to pass through in only the direction from the water storage container to the water-heating container is provided in said supply passage.

3. An electric water heater in accordance with claim 1 or 2, comprising a water amount sensor for detecting the amount of liquid in said water-heating container and a control circuit for controlling the water conveyance amount of said water conveyance device on the basis of the detection result of said water amount sensor.

4. An electric water heater in accordance with claim 2, wherein the liquid inlet of said supply passage which is a portion connected to said water-heating container is provided above the full levels of said water-heating container and said water storage container.

5. An electric water heater in accordance with claim 4, comprising a supply passage for supplying water from said liquid inlet to said water-heating container by using free fall or a downward slope.

6. An electric water heater in accordance with claim 4, wherein a liquid guide section is provided in the vicinity of said liquid inlet, and said liquid guide section pours water along the inner wall face of said water-heater container.

7. An electric water heater in accordance with claim 4, wherein a liquid guide section for pouring water along the inner wall face of said water-heating container is provided in the vicinity of said liquid inlet, and a liquid reforming section for improving the quality of liquid is provided in one or both of said liquid guide section and said water discharge passage.

8. An electric water heater in accordance with claim 1, wherein said water supply port is positioned above the substantial full-level position of said water-heating container.

9. An electric water heater in accordance with claim 1, wherein a projection section is provided on a side of the main body equipped with said water-heating container, and said projection is provided with said water supply port.

10. An electric water heater in accordance with claim 1, wherein a packing is provided at said water supply port so as to make contact with the connection section of said water storage tank.

11. An electric water heater in accordance with claim 1, wherein a packing is provided at the connection section facing to said water supply port of said water storage tank.

12. An electric water heater in accordance with claim 1, wherein a water supply pump for supplying water from said water storage tank to said water-heating container is provided.

13. An electric water heater in accordance with claim 1, wherein the highest position of the water conveyance passage from said water storage tank to the water supply port of said water-heating container is positioned above said water supply port.

14. An electric water heater in accordance with claim 1, wherein said water supply port is provided above the full-level position of said water storage tank.

15. An electric water heater in accordance with claim 9, wherein an engagement section to be engaged with said water storage tank is provided on said projection section.

16. An electric water heater in accordance with claim 1, wherein the drain port of said water supply passage is connected from said water supply port to said water-heating container via said water supply passage, and a low passage positioned below the drain port is provided at a part of said water supply passage.

17. An electric water heater in accordance with claim 1, wherein a stop valve for preventing liquid from flowing out at the time of turnover is provided in the water supply passage from which liquid is supplied from said water storage tank to said water-heating container.

* * * * *